United States Patent
Lee et al.

(10) Patent No.: US 10,912,117 B2
(45) Date of Patent: Feb. 2, 2021

(54) METHOD AND APPARATUS FOR COMPETITION-BASED TRANSMITTING OF UPLINK DATA IN WIRELESS COMMUNICATION SYSTEM TO WHICH NON-ORTHOGONAL MULTIPLE ACCESS SCHEME IS APPLIED

(71) Applicant: LG ELECTRONICS INC., Seoul (KR)

(72) Inventors: Hojae Lee, Seoul (KR); Kijun Kim, Seoul (KR); Byounghoon Kim, Seoul (KR); Sangrim Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 74 days.

(21) Appl. No.: 16/302,073

(22) PCT Filed: Apr. 25, 2017

(86) PCT No.: PCT/KR2017/004352
§ 371 (c)(1),
(2) Date: Nov. 15, 2018

(87) PCT Pub. No.: WO2017/204470
PCT Pub. Date: Nov. 30, 2017

(65) Prior Publication Data
US 2019/0150191 A1      May 16, 2019

Related U.S. Application Data

(60) Provisional application No. 62/340,465, filed on May 23, 2016.

(51) Int. Cl.
*H04W 74/08*        (2009.01)
*H04W 74/00*        (2009.01)
*H04J 99/00*        (2009.01)

(52) U.S. Cl.
CPC ....... *H04W 74/08* (2013.01); *H04W 74/0816* (2013.01); *H04J 15/00* (2013.01); *H04W 74/006* (2013.01)

(58) Field of Classification Search
None
See application file for complete search history.

(56) References Cited

U.S. PATENT DOCUMENTS

| | | | |
|---|---|---|---|
| 7,742,524 B2 * | 6/2010 | Jeon ...................... | H04N 19/61 375/240.13 |
| 8,929,319 B2 | 1/2015 | Anderson et al. | |

(Continued)

FOREIGN PATENT DOCUMENTS

| | | |
|---|---|---|
| KR | 1020100021381 | 2/2010 |
| KR | 1020130028741 | 3/2013 |

(Continued)

OTHER PUBLICATIONS

PCT International Application No. PCT/KR2017/004352, International Search Report dated Jul. 18, 2017, 4 pages.

(Continued)

*Primary Examiner* — Xavier S Wong
(74) *Attorney, Agent, or Firm* — Lee Hong Degerman Kang Waimey

(57) ABSTRACT

Provided are a method and an apparatus for competition-based transmitting of uplink data in a wireless communication system to which a non-orthogonal multiple access scheme is applied. Particularly, a terminal receives, from a base station, information relating to a predefined codeword for non-orthogonal multiple access. The predefined codeword includes a first spreading code and a second spreading code. The terminal configures a base layer using the first spreading code and configures an enhancement layer using the second spreading code. The terminal transmits a terminal identifier and data to the base station through a competition- (Continued)

based resource which overlappingly uses the base layer and the enhancement layer, wherein the terminal identifier is transmitted through the base layer and the data is transmitted through the enhancement layer.

12 Claims, 22 Drawing Sheets

(56) References Cited

U.S. PATENT DOCUMENTS

| | | | |
|---|---|---|---|
| 2015/0020131 A1* | 1/2015 | Choi | H04N 21/2381 |
| | | | 725/109 |
| 2015/0139120 A1* | 5/2015 | Elarabawy | H04L 5/0037 |
| | | | 370/329 |
| 2016/0119096 A1* | 4/2016 | Sun | H04W 72/082 |
| | | | 370/329 |
| 2016/0119807 A1* | 4/2016 | Sun | H04L 1/0029 |
| | | | 370/252 |
| 2016/0127092 A1 | 5/2016 | Zhang | |
| 2016/0241325 A1 | 8/2016 | Raghothaman et al. | |
| 2017/0013599 A1* | 1/2017 | Sun | H04L 5/0053 |
| 2017/0215179 A1 | 7/2017 | Choi et al. | |
| 2017/0331662 A1* | 11/2017 | Sun | H04L 27/362 |
| 2018/0103465 A1 | 4/2018 | Agiwal et al. | |
| 2018/0175968 A1* | 6/2018 | Shin | H04B 7/0456 |

FOREIGN PATENT DOCUMENTS

| | | |
|---|---|---|
| WO | 2011136586 | 11/2011 |
| WO | 2015065045 | 5/2015 |

OTHER PUBLICATIONS

Hellge, et al., "Layer-Aware Forward Error Correction for Mobile Broadcast of Layered Media", IEEE Transactions on Multimedia vol. 13, No. 3, pp. 551-562, Published Mar. 22, 2011, 13 pages.

U.S. Appl. No. 16/302,082, Office Action dated Jan. 13, 2020, 12 pages.

U.S. Appl. No. 16/302,082, Notice of Allowance dated Apr. 8, 2020, 8 pages.

* cited by examiner

METHOD AND APPARATUS FOR COMPETITION-BASED TRANSMITTING OF UPLINK DATA IN WIRELESS COMMUNICATION SYSTEM TO WHICH NON-ORTHOGONAL MULTIPLE ACCESS SCHEME IS APPLIED

BACKGROUND OF THE INVENTION

Cross-Reference to Related Applications

This application is the National Stage filing under 35 U.S.C. 371 of International Application No. PCT/KR2017/004352, filed on Apr. 25, 2017, which claims the benefit of U.S. Provisional Application No. 62/340,465, filed on May 23, 2016, the contents of which are all hereby incorporated by reference herein in their entirety.

Field of the Invention

The present specification relates to wireless communication, and more particularly, to a method and apparatus for contention-based transmission of uplink data in a wireless communication system to which a non-orthogonal multiple access scheme is applied.

Related Art

A wireless communication system is widely deployed to provide various types of communication services, such as voice and data. An object of a wireless communication system is to enable a plurality of UEs to perform reliable communication regardless of their locations and mobility.

In general, a wireless communication system is a multiple access system capable of supporting communication with a plurality of UEs by sharing available radio resources. Examples of radio resources include time, a frequency, code, transmission power and so on. Examples of a multiple access system includes a time division multiple access (TDMA) system, a code division multiple access (CDMA) system, a frequency division multiple access (FDMA) system, an orthogonal frequency division multiple access (OFDMA) system, a single carrier frequency division multiple access (SC-FDMA) system and so on.

A requirement of a next-generation wireless communication system is to accommodate significantly explosive data traffic, to increase a dramatic increase in a transfer rate per user, to accommodate the significantly increased number of connected devices, and to support a very low end-to-end (E2E) latency and high energy efficiency. For this, there is ongoing research on various techniques such as dual connectivity, massive multiple input multiple output (MIMO), in-band full duplex, non-orthogonal multiple access (NOMA), super wideband support, device networking, or the like.

SUMMARY OF THE INVENTION

The present specification proposes a method and apparatus for contention-based transmission of uplink data in a wireless communication system to which a non-orthogonal multiple access scheme is applied.

The present specification proposes a method and apparatus for transmitting uplink data in a contention-based manner in a wireless communication system to which a non-orthogonal multiple access scheme is applied.

The apparatus includes a radio frequency (RF) unit transmitting and receiving a radio signal, and a processor operatively coupled to the RF unit.

First, a contention-based resource may correspond to a resource region for contention-based uplink connection or uplink data transmission on the basis of non-orthogonal multiple access A user equipment (UE) receives, from a base station, information regarding a pre-defined codeword for non-orthogonal multiple access. The pre-defined codeword includes a first spreading code and a second spreading code. The pre-defined codeword may correspond to all codewords included in a codebook pre-defined between the base station and the UE. Therefore, both of the first spreading code and the second spreading code may correspond to the codeword.

The UE configures a base layer by using the first spreading code, and configures an enhancement layer by using the second spreading code.

The UE transmits a UE identification and data to the base station through a contention-based resource which uses the base layer and the enhancement layer in a superposed manner. In this case, the UE identification is transmitted through the base layer, and the data is transmitted through the enhancement layer. In addition, the UE identification and the data are transmitted through the same data channel. The UE identification and the data may be transmitted only with the data channel without having to distinguish a control channel and the data channel, each of which has different reliability.

That is, in the present embodiment, one user (or UE) performs contention-based transmission by superposing two layers (a base layer and an enhancement layer) in a wireless communication system to which a non-orthogonal multiple access scheme is applied. Since the base layer and the enhancement layer are identified with a codeword, a contention-based resource may be identified with the base layer and the enhancement layer according to the codeword.

The base station may perform multi-user detection (MUD) for the data and the UE identification transmitted by the UE. If the base station succeeds in detection of the UE identification and fails in detection of the data, the UE may receive a retransmission request for the data from the base station. Since detection of the UE identification is successful, the base station can recognize which UE transmits the data, and thus data retransmission can be requested to a corresponding UE. The UE may retransmit the data to the base station through the enhancement layer. In this case, the UE identification and the data retransmitted from the UE may be decoded by being combined to each other. Without having to retransmit the UE identification, the base station may decode the UE identification by combining the retransmitted data and the UE identification previously transmitted through the base layer.

In addition, the UE may transmit a reference signal for channel estimation to the base station. In this case, the number of reference signals is less than the number of pre-defined codewords. In addition, it may be configured such that the base layer and enhancement layer which are used in a superposed manner may correspond to one reference signal. The reference signal may correspond to a DMRS.

Conventionally, since contention-based data transmitted from multiple users is identified with the DMRS, it has been meaningless even if the number of codewords is greater than the number of DMRSs. However, if the base layer and enhancement layer for one user are tied to one DMRS, two codewords can be used with one DMRS. Therefore, even if the number of codewords is greater than the number of DMRSs, it is possible to identify more layers than the number of DMRSs.

In addition, the UE may receive power allocation information for the base layer and the enhancement layer from the base station through radio resource control (RRC) signaling, high layer signaling, or common control information. Accordingly, the base station performs channel equalization on the basis of the power allocation information for each layer.

A code rate for the base layer and a code rate for the enhancement layer may be designated according to a codeword index of the predefined codeword. Alternatively, modulation and coding scheme (MCS) for the base layer and MCS for the enhancement layer may be designated according to the codeword index of the predefined codeword.

That is, a relation between the codeword for the base layer/enhancement layer and the codeword index and a relation between the MCS for the base layer/enhancement layer and the codeword index are broadcast to all UEs located in a cell in a look up table manner. The codeword index may be pre-defined by being tied to the codeword for each user. Therefore, the base station may estimate a code rate on the basis of a codeword index when performing blind detection. By recognizing the base layer, the base station may select a layer to be preferentially selected when performing SIC.

The use of the proposed scheme has an advantage in that hierarchical coding/modulation is utilized to decrease an error rate obtained through each layer, to increase a total average system data rate that can be transmitted through each layer, or to support a greater number of users on average.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink.

For clarity of explanation, the following description will focus on the 3GPP LTE/LTE-A. However, technical features of the present invention are not limited thereto.

Figure 1:
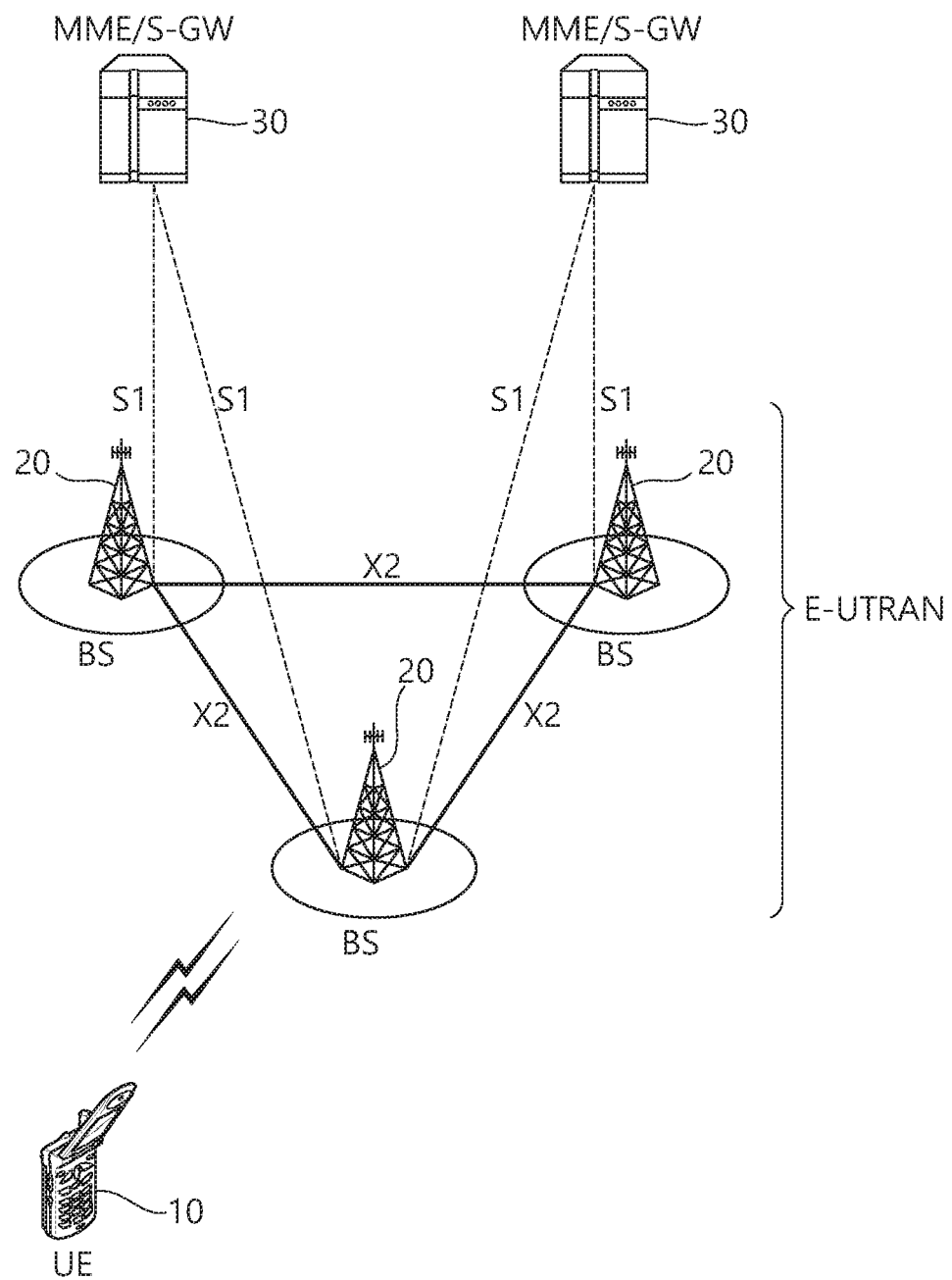
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

A radio interface between the UE and the BS is called a Uu interface. Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
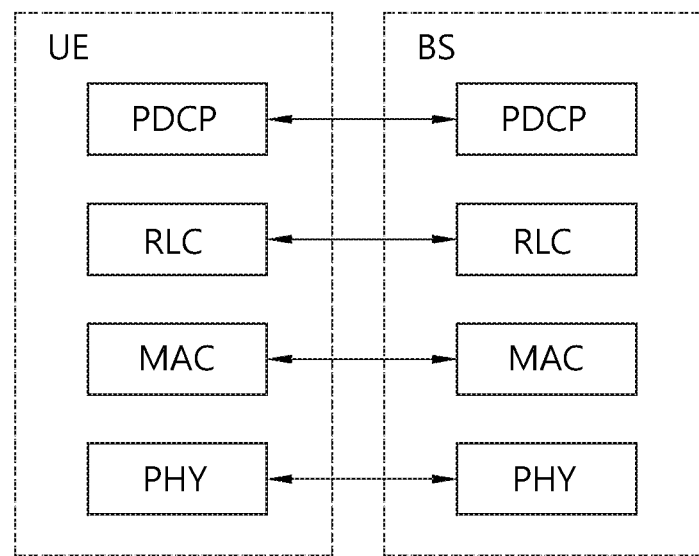
FIG. 2 is a diagram illustrating a radio protocol architecture for a user plane.
Figure 3:
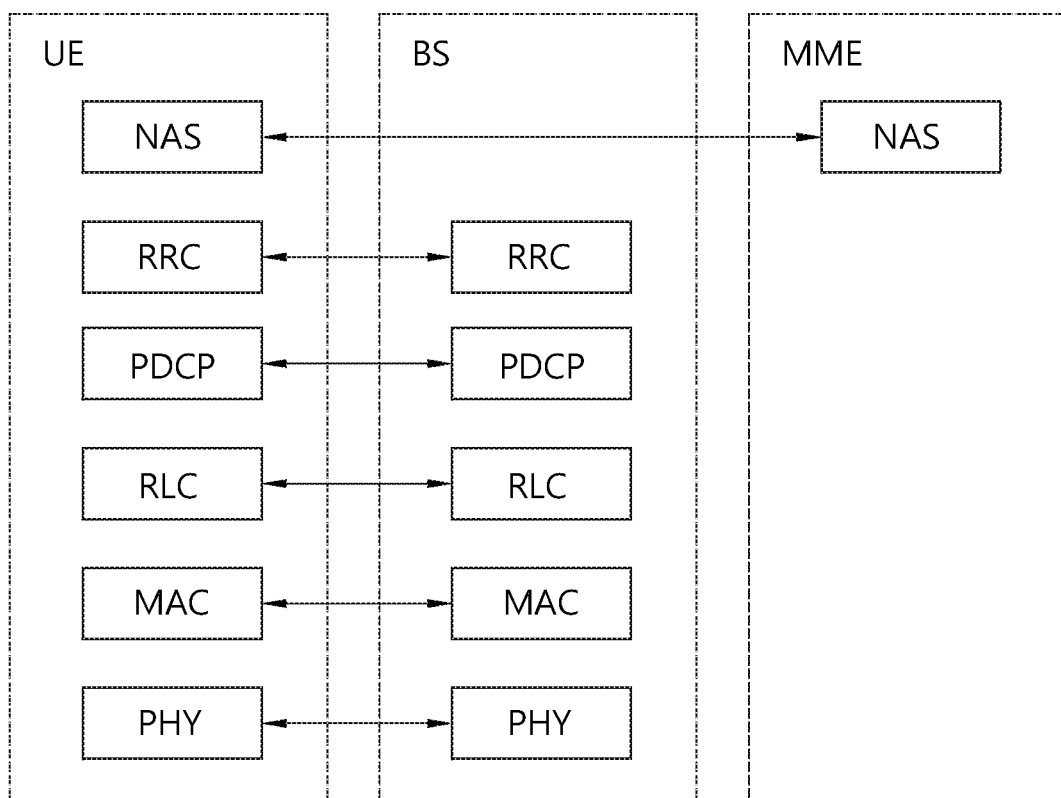
FIG. 3 is a diagram illustrating a radio protocol architecture for a control plane.

FIG. 2 is a diagram illustrating a radio protocol architecture for a user plane. FIG. 3 is a diagram illustrating a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs).

An RB is a logical path provided by the first layer (i.e., the PHY layer) and the second layer (i.e., the MAC layer, the RLC layer, and the PDCP layer) for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state, and otherwise the UE is in an RRC idle state.

Data is transmitted from the network to the UE through a downlink transport channel Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
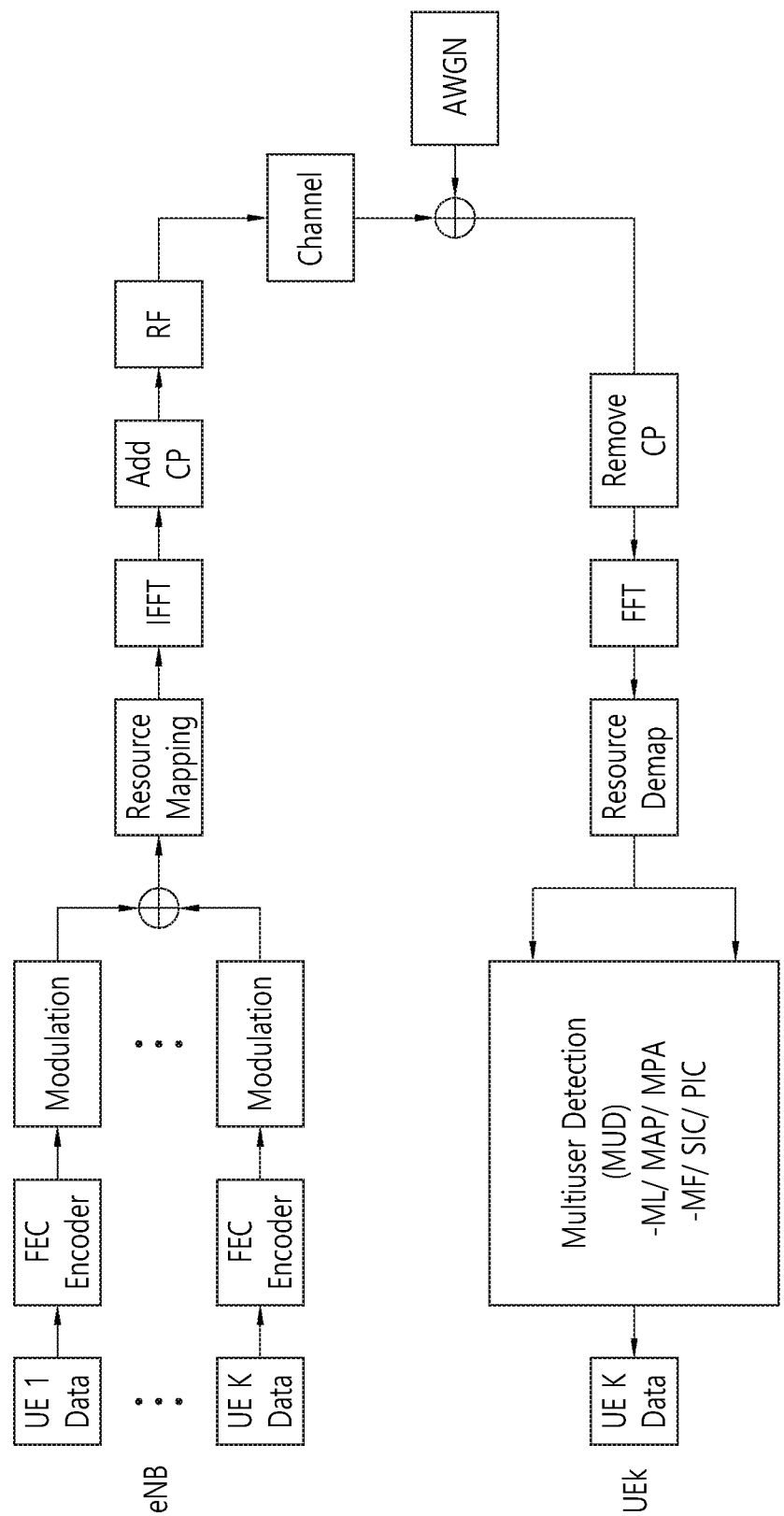
FIG. 4 is a block diagram illustrating NOMA based downlink transmission/reception (Tx/Rx) of a communication apparatus.

FIG. 4 is a block diagram illustrating NOMA based downlink transmission/reception (Tx/Rx) of a communication apparatus.

In a Non-orthogonal Coded Multiple Access (NCMA) scheme for transmitting multi-UE (or multi-user) information by allocating the multi-UE information to the same resource, a transmitter and receiver structure for downlink support as shown in FIG. 4 is general. The NOMA system may be referred to as Multiuser Superposition Transmission (MUST) in the 3GPP standardization task. The NOMA system is considered as the element technology of the next generation 5G system intended to obtain transmission capacity gain or increase the number of simultaneous accesses as compared with the LTE system by transmitting information for a plurality of UEs to the same time-frequency resource through superposition. Examples of the NOMA based technology of the next generation 5G system include MUST for identifying UEs based on a power level, Sparse Code Multiple Access (SCMA) that uses sparse complex codebook based modulation, and interleave division multiple access (IDMA) that uses a user-specific interleaver.

In case of the MUST system, the transmitter of FIG. 4 varies power allocation of each symbol after modulation of multi-UE data or transmits the multi-UE data by hierarchically modulating the multi-UE data based on hierarchical modulation, and the receiver demodulates the data of the multi-UE (hereinafter, referred to as multi-UE data) through multi-UE detection (or multiuser detection) (MUD).

In case of the SCMA system, the transmitter of FIG. 4 replaces a modulation procedure of a forward error correction (FEC) encoder and modulation procedure for multi-UE data with a sparse complex codebook modulation scheme which is previously scheduled, and the receiver demodulates the multi-UE data through MUD.

In case of the IDMA system, the transmitter of FIG. 4 modulates FEC encoding information for multi-UE data through a UE-specific interleaver, and the receiver demodulates the multi-UE data through MUD.

Each system may demodulate the multi-UE data in various MUD schemes. Examples of the various MUD schemes include Maximum Likelihood (ML), Maximum joint A posteriori Probability (MAP), Message Passing Algorithm (MPA), Matched Filtering (MF), Successive Interference Cancellation (SIC), Parallel Interference Cancellation (PIC), and Codeword Interference Cancellation (CWIC). There may be a difference in demodulation complexity and processing time delay in accordance with each demodulation scheme or each demodulation attempt.

Figure 5:
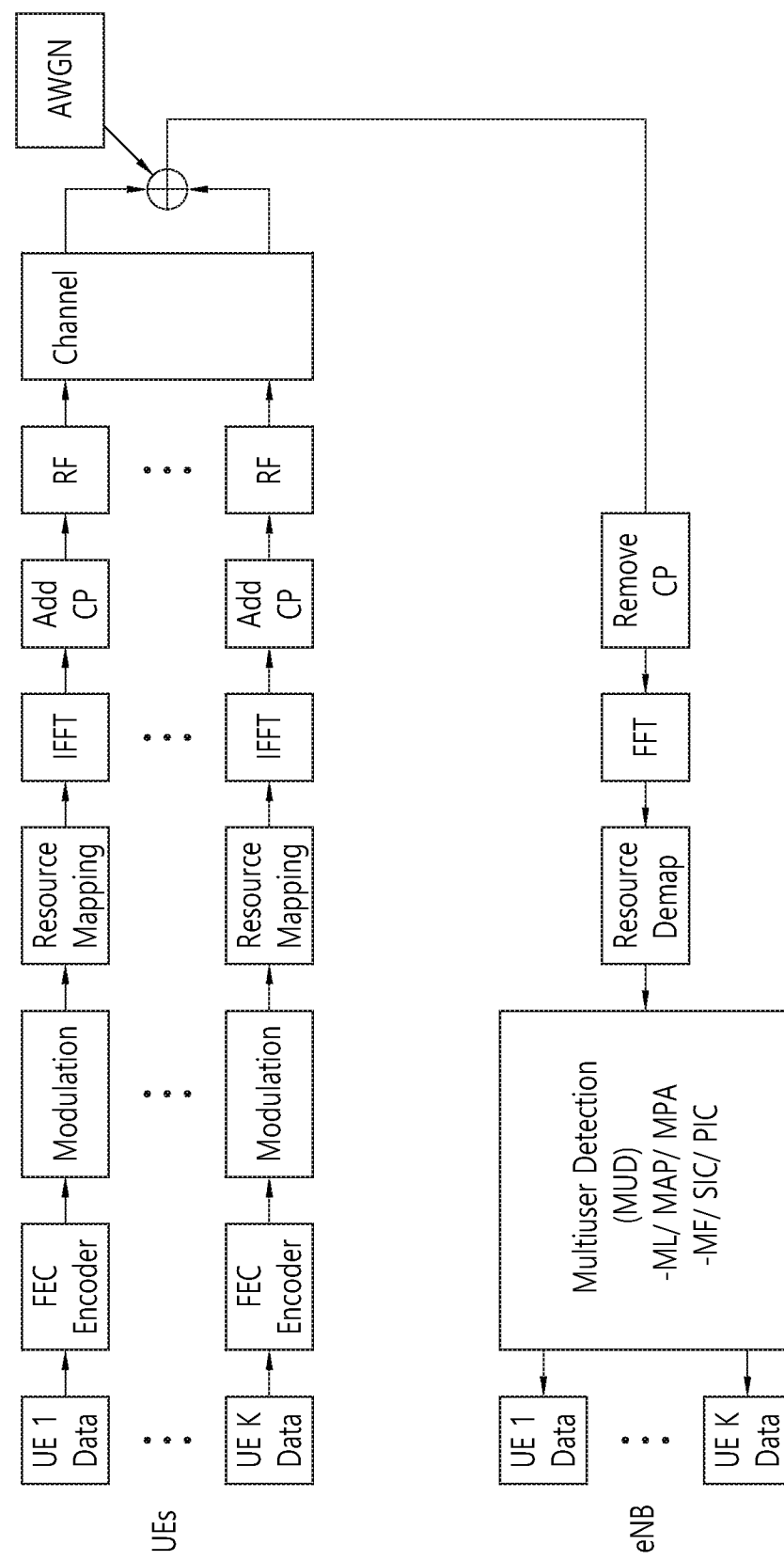
FIG. 5 is a block diagram illustrating NOMA based uplink transmission/reception (Tx/Rx) of a communication apparatus.

FIG. 5 is a block diagram illustrating NOMA based uplink transmission/reception (Tx/Rx) of a communication apparatus.

A transmitter and receiver structure for uplink support of the NOMA based system that transmits information of multi-UE (hereinafter, referred to as multi-UE information) by allocating the multi-UE information to the same resource is shown in FIG. 5. Each system may transmit multi-UE data in the same manner as the description of the downlink structure of FIG. 4 and modulate the multi-UE data through the receiver. Since the NOMA based systems transmit multi-UE signals to the same time-frequency resource through superposition, the systems have a higher decoding error rate as compared with the LTE system but may support higher frequency usage efficiency or more massive connectivity. The NOMA systems may achieve higher frequency usage efficiency or more massive connectivity while maintaining a decoding error through coding rate control in accordance with a system environment.

Since the NOMA based systems allocate data of multi-UEs to the same resource, interference of multi-UE data is necessarily generated as compared with allocation of single-UE data. A signal of the kth receiver in the NOMA based system of FIG. 4 is simply expressed as illustrated in the following Equation 1.

$$y_k = \sum_{n=1}^{K} h_k s_n + n_k = h_k s_k + \sum_{n \neq k, n=1}^{K} h_k s_n + n_k \quad \text{[Equation 1]}$$

In this case, $h_k$ means a channel from the transmitter to the kth receiver, $s_k$ means a data symbol to the kth receiver, and $n_k$ means signal noise. K is the number of multiple UEs allocated to the same time-frequency resource.

The second term $$\sum_{n \neq k, n=1}^{K} h_k s_n$$

of the third formula of the Equation 1 indicates multiuser interference (MUI) signal according to a data symbol to another receiver. Therefore, transmission capacity according to the received signal is simply expressed as illustrated in the following Equation 2.

$$C = \sum_{k=1}^{K} R_k \quad \text{[Equation 2]}$$

$$R_k = \log_2\left(1 + \frac{|h_k s_k|^2}{\left|\sum_{n \neq k, n=1}^{K} h_k s_n\right|^2 + \sigma_k}\right) =$$

$$\log_2\left(1 + \frac{\text{Channel Gain}}{\text{MUI} + \text{Noise}}\right), \forall k$$

In transmission capacity of the above Equation 2, the number of Rk added in accordance with increase of K may be increased, whereby increase of C may be expected. However, each Rk may be reduced due to increase of MUI in accordance with increase of K, entire transmission capacity C may be reduced. In accordance with the MUD scheme, even though data of each UE may be demodulated while MUI is being effectively reduced, the presence of MUI reduces entire transmission capacity and requires MUD of high complexity. If MUI occurrence of data transmission of the multi-UE is minimized, higher transmission capacity may be expected. Alternatively, if MUI occurrence for data transmission of the multi-UE may be controlled quantitatively, higher transmission capacity may be planned by scheduling of data superposition of the multi-UE. Therefore, the development of multi-UE access technology that may control MUI according to data superposition transmission of the multi-UE is required. The development of multi-UE access technology that may control MUI generated during data superposition transmission of the multi-UE to the same time-frequency resource is required.

Therefore, the present invention suggests a non-orthogonal coded multiple access (NCMA) that minimizes multi-UE interference of the next generation 5G system.

Figure 6:
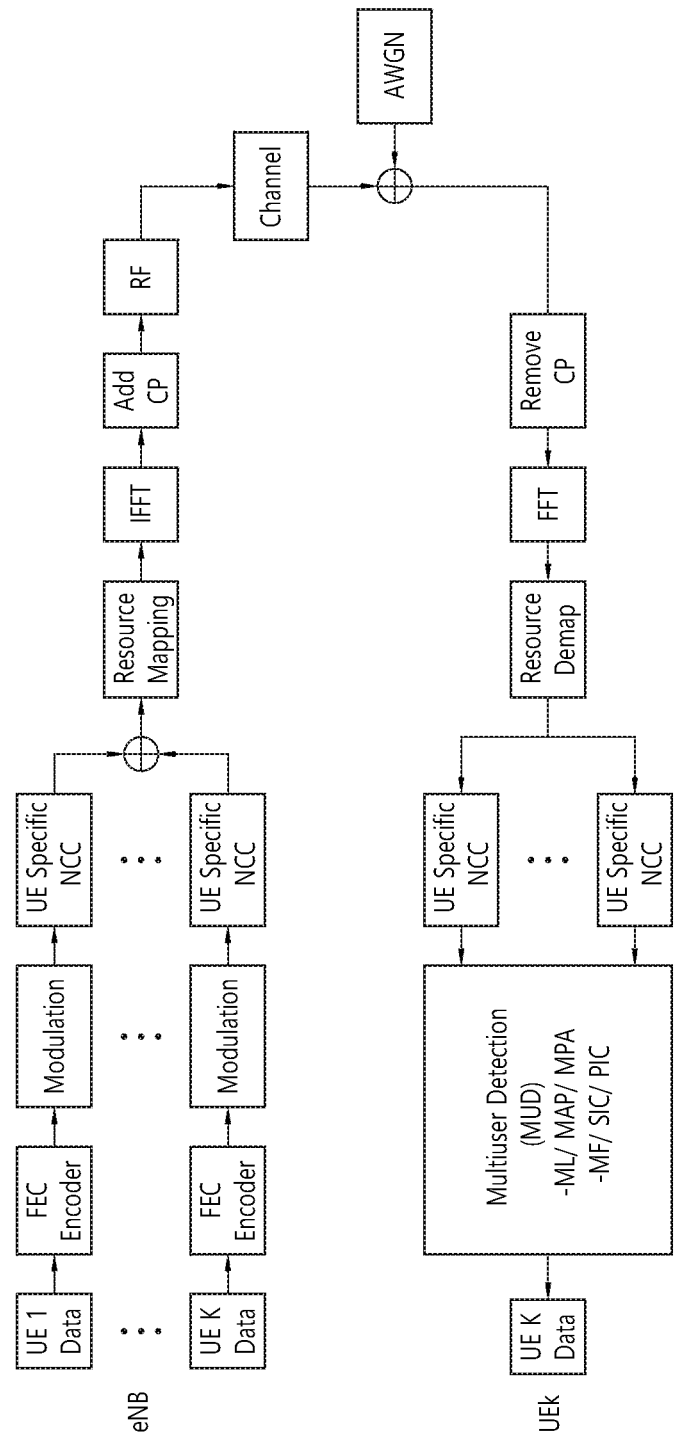
FIG. 6 is a block diagram illustrating NCMA based downlink transmission/reception (Tx/Rx) of a communication apparatus.
Figure 7:
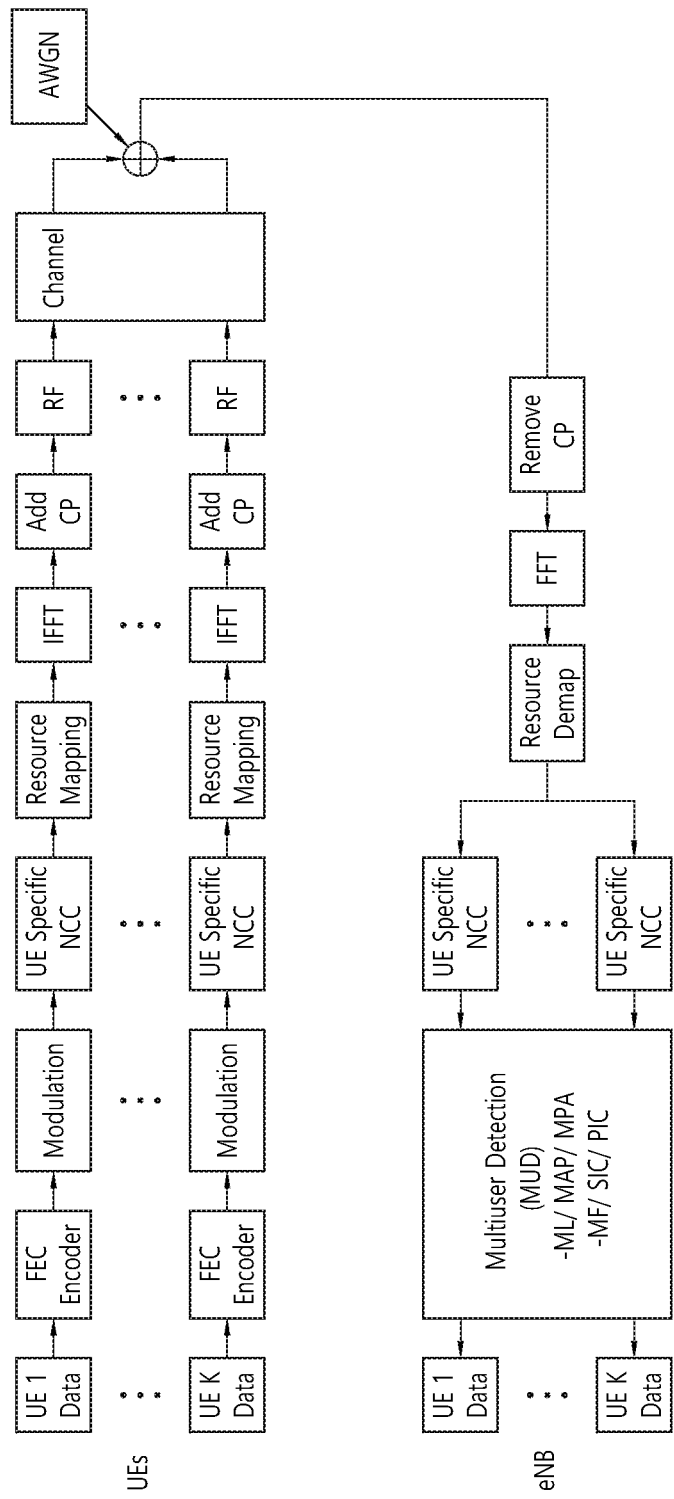
FIG. 7 is a block diagram illustrating NCMA based uplink transmission/reception (Tx/Rx) of a communication apparatus.

FIG. 6 is a block diagram illustrating NCMA based downlink transmission/reception (Tx/Rx) of a communication apparatus, and FIG. 7 is a block diagram illustrating NCMA based uplink transmission/reception (Tx/Rx) of a communication apparatus.

The present invention suggests an NCMA scheme that minimizes multi-UE interference when data of multi-UE are transmitted to the same time-frequency resource through superposition. FIGS. 6 and 7 illustrate downlink and uplink transmitter and receiver structures of the NCMA system that performs superposition transmission by using UE specific non-orthogonal code cover (NCC) when multi-UE information is allocated to the same time-frequency resource. The transmitter/receiver (or transmitting side/receiving side) allocates UE-specific NCC to each UE by using a non-orthogonal codebook which is previously defined.

The codeword mentioned in the present invention means a complex element vector selected by (or allocated to) each UE to perform non-orthogonal multiple access. The codebook means a set of codewords used by each UE to perform non-orthogonal multiple access. The codebook mentioned as above may exist as a plurality of codebooks. The UE-specific NCC means that the complex element vector of the codebook selected by (or allocated to) each UE is used for a symbol to be transmitted. Therefore, the NCC (or UE-specific NCC) may be expressed as codebook index and codeword index. The non-orthogonal codebook is expressed as illustrated in the following Equation 3.

$$C = [c^{(1)} \ldots c^{(K)}] = \begin{bmatrix} c_1^{(1)} & \ldots & c_1^{(K)} \\ \vdots & \ddots & \vdots \\ c_N^{(1)} & \ldots & c_N^{(K)} \end{bmatrix} \quad \text{[Equation 3]}$$

In the above Equation 3, $c^{(j)}$ is a codeword for the jth UE, and a codeword set for a total of K UEs becomes a codebook C. Use of $c^{(j)}$ for data transmission of the jth UE is defined as NCC. Also, the codebook may be expressed as a vector length N of the codeword and the number K of codewords. In this case, N means a spreading factor, and K means a superposition factor. For convenience of description, although one codeword is used for one UE, a plurality of codewords may be used by one UE or one codeword may be used by a plurality of UEs. Also, one or more codewords allocated to one UE may be subjected to hopping of codewords by use of different codewords in the same codebook or use of different codewords in different codebooks in accordance with time or usage frequency.

UE-specific NCC may be allocated by connection with UE ID in RRC connection process, or may be allocated through DCI (downlink control information) format included in a downlink control channel (for example, PDCCH).

In case of an uplink environment used for contention based multiple access (MA), a UE may select non-orthogonal codewords randomly or through connection with UE ID. At this time, UE-specific NCC is not allocated by a base station but directly selected by a UE, whereby NCC contention between multiple UEs may occur. A success rate for identification of multi-UE information is reduced due to MUD if there is contention of NCC in the base station which is a receiver.

The UE-specific NCC may be defined by Grassmannian line packing, and a chordal distance formed by two random vectors in the same subspace is always maintained equally. That is, the chordal distance may be obtained mathematically or algorithmically as a codebook that satisfies $\min_C(\max_{1 \leq k < j \leq K} \sqrt{1-|c^{(k)*}*c^{(j)}|^2})$, $C \subset \mathbb{C}^{N \times K}$.

The UE-specific NCC has features as expressed by the following Equation 4.

$$\begin{cases} |c^{(k)*} \cdot c^{(k)}| = 1, \; \forall \, k, k = 1, \ldots, K, \\ \text{if } N > K, |c^{(k)*} \cdot c^{(j)}| = \delta, \; \forall \, k, \forall \, j, k = 1, \ldots, K, j = 1, \ldots, K, \\ \text{if } N \leq K, |c^{(k)*} \cdot c^{(j)}| = 0, \; \forall \, k, \forall \, j, k = 1, \ldots, K, j = 1, \ldots, K. \end{cases} \quad \text{[Equation 4]}$$

In this case, $c^{(k)*}$ is a conjugate codeword of c(k). The features of the Equation 4 are as listed in the followings (1), (2), and (3).

(1) Multiplication of the same codewords in the transmitter and the receiver is 1.

(2) The chordal distance between a codeword and another codeword in the same codebook is equally maintained.

(3) If N≤K, a codeword is orthogonal to another codeword.

The codebook having the above features is previously scheduled by the transmitter/receiver (or transmitting side/receiving side) to configure UE-specific NCC. In this case, a lower bound of a chordal distance $$\delta_{N,K} \geq \sqrt{1 - \frac{(N-1)K}{N(K-1)}}$$

according to two random codewords is obtained. Therefore, MUI for superposition transmission of multi-UE data is determined by being minimized by the lower bound. Also, since the chordal distance for the two random codewords is always maintained equally, statistical prediction of MUI may be performed by the number of UEs. If the number of UEs is determined, since a decoding error rate of the receiver may be predicted by MUI value, MCS level may be controlled based on interference for multi-UE superimposition transmission. For example, when K codewords are transmitted in (N×1) dimension, if the receiver performs decoding using its codewords, 1 is decoded from its codeword, and statistical interference of $\delta_{N,K}(K-1)$ remains from another K−1 codewords. This value is varied depending on an optimization level of a codebook design. Also, since a difference in a value of $\delta_{N,K}$ exists depending on the optimization level of the codebook design, the number K of superposition UEs or the number N of used resources may be varied depending on Required SINR or target QoS of the communication system, whereby the MUI value may be controlled.

The embodiment of the non-orthogonal codebook is expressed in the form of 3GPP TS 36.211 as listed in that following Tables 1 and 2, and may be used as UE-specific NCC.

Table 1 illustrates a codebook in case of Spreading Factor N=2.

TABLE 1

| # of codewords (Max. # of users: K) | Examples of spreading codebook $[c^{(1)} \ldots c^{(K)}]$ |
|---|---|
| 2 | $\begin{bmatrix} 1 & 1 \\ 1 & -1 \end{bmatrix}$ |
| 3 | $\begin{bmatrix} -0.5078 - 0.2451i & -0.8055 + 0.5684i & -0.1483 - 0.4194i \\ 0.5640 - 0.6034i & 0.1640 + 0.0357i & -0.8751 - 0.1904i \end{bmatrix}$ |
| 4 | $\begin{bmatrix} -0.4907 - 0.7256i & -0.6440 - 0.5906i & -0.1657 + 0.2160i & -0.5775 - 0.2480i \\ 0.4510 + 0.1709i & -0.4452 + 0.1956i & 0.9349 - 0.2279i & -0.3586 - 0.6902i \end{bmatrix}$ |

Table 2 illustrates a codebook in case of Spreading Factor N=4.

TABLE 2

| # of codewords (Max. # of users: K) | Examples of spreading codebook $[c^{(1)} \ldots c^{(K)}]$ |
|---|---|
| 4 | $\begin{bmatrix} 1 & 1 & 1 & 1 \\ 1 & -1 & 1 & -1 \\ 1 & 1 & -1 & -1 \\ 1 & -1 & -1 & 1 \end{bmatrix}$ |
| 6 | $\begin{bmatrix} -0.0557-0.4476i & -0.1684-0.8131i & -0.0149+0.2255i & \cdots \\ & -0.0198-0.1206i & -0.3294-0.3689i & -0.0487+0.4148i \\ 0.4023-0.1460i & -0.4021+0.2118i & -0.6703+0.0282i & \cdots \\ & -0.6521-0.4251i & -0.0729-0.0903i & -0.2158-0.3003i \\ 0.1499\ 0.3961i & 0.0471\ 0.2647i & 0.3131\ 0.5204i & \cdots \\ & -0.5576-0.0206i & 0.6726-0.0552i & 0.0357+0.0924i \\ 0.5675+0.3346i & -0.0866+0.1557i & -0.0287+0.3624i & \cdots \\ & -0.0286+0.2589i & 0.4567-0.2792i & 0.6985+0.4372i \end{bmatrix}$ |
| 8 | $\begin{bmatrix} -0.2381-0.8369i & -0.6599-0.1222i & -0.6557-0.1776i & -0.1561+0.0861i & \cdots \\ & -0.1374+0.1275i & -0.1849+0.3859i & -0.2426-0.2248i & -0.1703-0.0604i \\ -0.2593-0.3320i & 0.4906+0.0221i & 0.3934+0.2749i & -0.3453-0.2068i & \cdots \\ & -0.5596+0.0272i & 0.0616-0.0315i & -0.3027-0.3133i & -0.7664+0.1256i \\ -0.1249+0.0320i & 0.0425+0.3856i & 0.0440-0.3295i & -0.3979+0.0525i & \cdots \\ & -0.5272-0.2195i & 0.0649-0.8770i & -0.2452+0.4427i & -0.0149-0.4727i \\ -0.2180-0.0342i & 0.3968-0.0250i & -0.3444-0.2811i & -0.7817-0.1845i & \cdots \\ & 0.2417+0.5162i & 0.1956-0.0203i & 0.4625-0.4805i & 0.0794-0.3663i \end{bmatrix}$ |

Various values may be obtained using mathematical equation or algorithm in addition to the above Tables 1 and 2.

Figure 8:
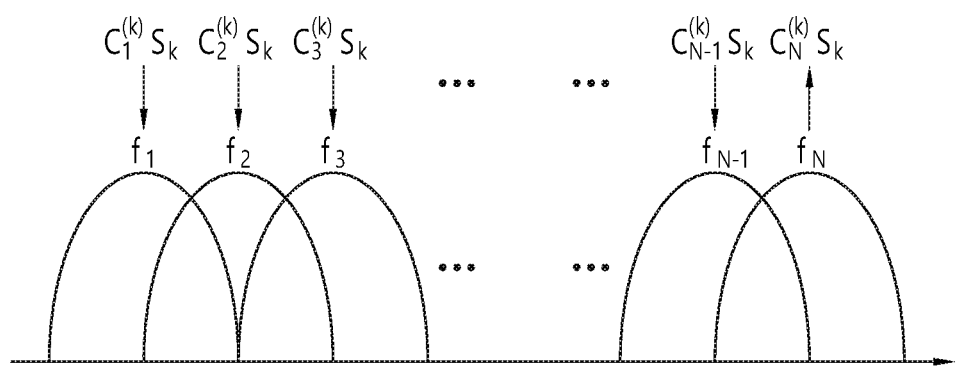
FIG. 8 is a conceptual diagram illustrating a frequency axis of data transmission according to UE-specific NCC.

FIG. 8 is a conceptual diagram illustrating a frequency axis of data transmission according to UE-specific NCC.

FIG. 8 illustrates a concept that a transmitter (or transmitting side) transmits kth UE data on a frequency axis through UE-specific NCC. When UE-specific NCC defined by Grassmaniann line packing is previously scheduled by the transmitter and the receiver, data for the kth UE is multiplied by a codeword corresponding to the kth UE. At this time, one data symbol sk corresponds to a codeword vector $c^{(k)}$ of (N×1) dimension. Then, N elements of the codeword correspond to N subcarriers.

That is, in FIG. 8, since one data symbol is transmitted to N subcarriers, the same time-frequency resource efficiency is reduced to 1/N as compared with the legacy LTE system. On the other hand, if N or more symbols are transmitted by superposition, time-frequency resource efficiency is increased as compared with the LTE system. For example, if K symbols are transmitted by superposition in case of N<K, frequency resource efficiency is increased as much as K/N times.

Figure 9:
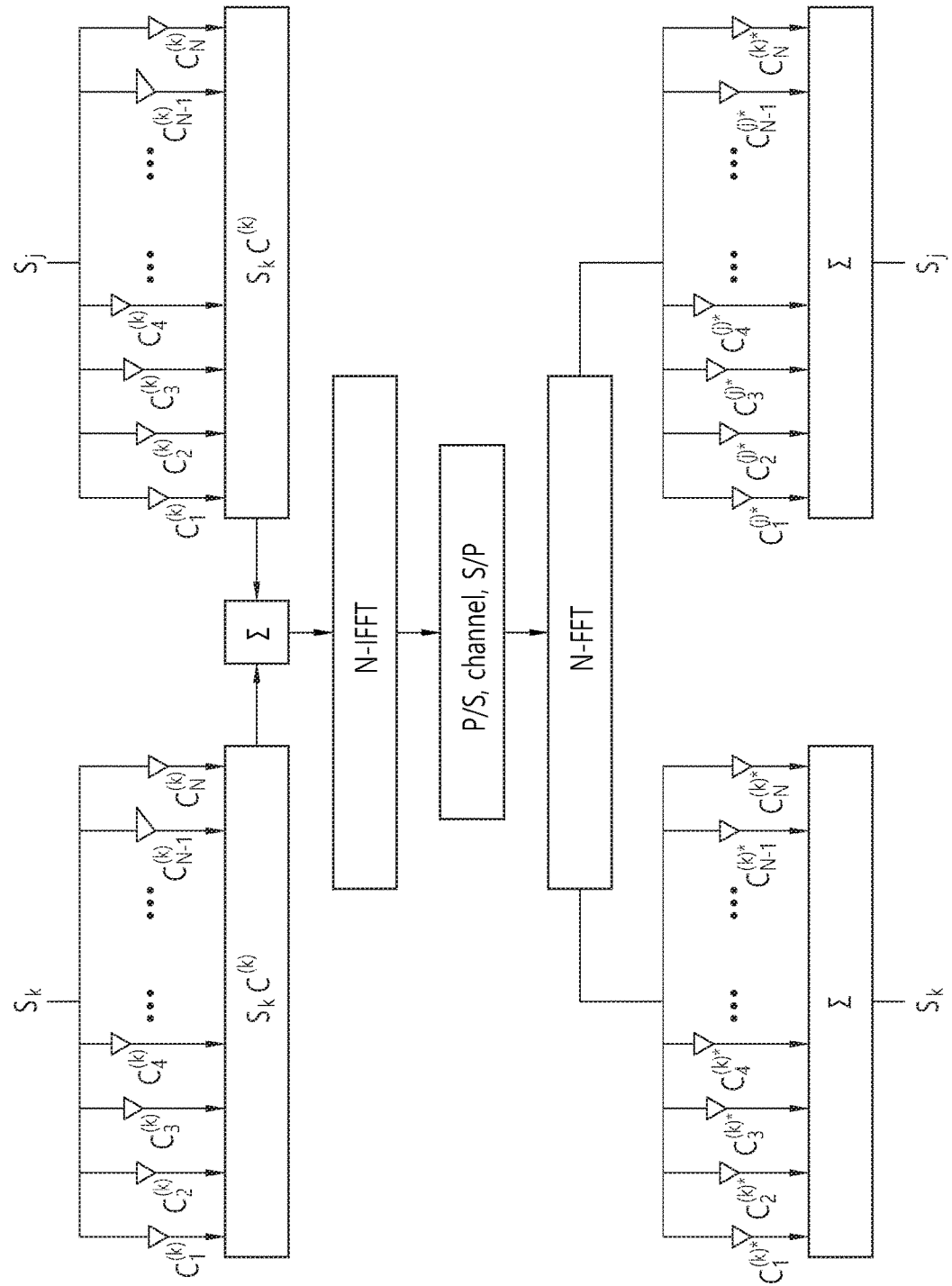
FIG. 9 is a structural diagram illustrating basic transmission and reception of NCMA system.

FIG. 9 is a structural diagram illustrating basic transmission and reception of NCMA system.

FIG. 9 is a basic transmission and reception structural view of NCMA system that uses UE-specific NCC. Data symbols for each UE are converted to UE-specific NCC corresponding to each UE and superposed in the transmitter. A frequency axis signal of a superposed N length is converted to a time-axis signal through N-IFFT, whereby OFDM transmission is performed, and the receiver restores the time-axis signal to a frequency-axis signal through N-FFT. The restored frequency-axis signal decodes each UE data symbol using a conjugate codeword of UE-specific NCC corresponding to each UE. The decoded $s_k$ may include MUI depending on the number of superposed UEs, and exact $s_k$ decoding is available through MUD. At this time, the length of the frequency-axis signal converted in accordance with UE-specific NCC which is previously defined may be shorter than N. For example, if two frequency-axis signal vectors converted to UE-specific NCC of N/2 length are connected in series to form N length, it will be apparent that demodulation is available in the receiver even in case of N-FFT.

In case of downlink, a detection equation for data decoding in the kth UE receiver is expressed as illustrated in the following Equation 5.

$$y_k = \sum_{n=1}^{K} H_k c^{(n)} s_n + n_k,$$

$$\hat{y}_k = \left[ \frac{[y_k]_j}{[H_k]_{j,j}} \right]_{j=1,\ldots,N} = \sum_{n=1}^{K} c^{(n)} s_n + \hat{n}_k,$$

[Equation 5]

In the above Equation 5, $H_k$ means (N×N) channel matrix from the kth transmitter to the receiver, and includes frequency-axis channel coefficients as a diagonal matrix. $c^{(k)}$ is (N×1) UE-specific NCC vector for the receiver at the kth transmitter, $s_k$ is a data symbol to the kth receiver, and n means (N×1) signal noise vector. K is the number of multi-UEs allocated to the same time-frequency resource. In this case, $$\left[\frac{[A]_j}{[B]_{j,j}}\right]_{j=1,\ldots,N}$$

means division of the jth element of vector A and the jth diagonal element of matrix B. If the vector A is a diagonal matrix, the vector A means element division of diagonal matrixes.

A signal of desired codewords and noise remain through channel compensation in the above Equation 5, and are detected as expressed by the following Equation 6 through conjugate codeword of UE-specific NCC of the receiver.

$$\tilde{y}_k = c^{(k)*} \cdot \hat{y}_k = c^{(k)*} \cdot c^{(k)} s_k + \sum_{n \neq k, n=1}^{K} c^{(k)*} \cdot c^{(n)} s_n + \tilde{n}_k, \quad \text{[Equation 6]}$$

$$= s_k + \sum_{n \neq k, n=1}^{K} c^{(k)*} \cdot c^{(n)} s_n + \tilde{n}_k.$$

In the above Equation 6, the second item of the last column indicates MUI, and may be removed or reduced through the MUD scheme.

In case of uplink, a detection equation for data decoding in the receiver of the base station is expressed as illustrated in the following Equation 7.

$$y = \sum_{n=1}^{K} H_n c^{(n)} s_n + n = H_k c^{(k)} s_k + \sum_{n \neq k, n=1}^{K} H_n c^{(n)} s_n + n, \quad \text{[Equation 7]}$$

The second term of the third formula of the Equation 7 indicates multi-UE interference signal MUI according to a data symbol to another receiver. A detection equation of the receiver for data decoding of the kth UE is expressed as illustrated in the following Equation 8.

$$\hat{y}_k = \left[\frac{[y]_j}{[H_k]_{j,j}}\right]_{j=1,\ldots N} = \quad \text{[Equation 8]}$$

$$c^{(k)} s_k + \sum_{n=1}^{K} \left[\frac{[H_n]_{j,j}}{[H_k]_{j,j}}\right]_{j=1,\ldots N} c^{(n)} s_n + \hat{n},$$

A signal of desired codewords, MUI, and noise remain through channel compensation for the kth UE data, and are detected as expressed by the following Equation 9 through conjugate codeword of UE-specific NCC of the receiver.

$$\hat{y}_k = c^{(k)*} \cdot \hat{y}_k \quad \text{[Equation 9]}$$

$$= c^{(k)*} \cdot c^{(k)} s_k + \sum_{n \neq k, n=1}^{K} c^{(k)*} \cdot \left[\frac{[H_n]_{j,j}}{[H_k]_{j,j}}\right]_{j=1,\ldots,N} c^{(n)} s_n + \tilde{n},$$

$$= s_k + \sum_{n \neq k, n=1}^{K} c^{(k)*} \cdot \left[\frac{[H_n]_{j,j}}{[H_k]_{j,j}}\right]_{j=1,\ldots,N} c^{(n)} \cdot s_n + \tilde{n}.$$

In the above Equation 9, the second item of the last column indicates MUI, and may be removed or reduced through the MUD scheme. At this time, frequency-axis channel change of $$\left[\frac{[H_n]_{j,j}}{[H_k]_{j,j}}\right]_{j=1,\ldots,N}$$

causes a change of MUI value when MUD according to UE-specific NCC is performed due to a change of a channel environment from the multi-UE. For convenience of description, a single transmitting and receiving antennas is provided, it will be apparent that the same scheme is applied to even an environment where multiple antennas are used.

According to the description related to the aforementioned NCMA scheme, it is possible to achieve higher frequency usage efficiency or more massive connectivity in accordance with the number of superposed UEs while controlling MUI according to multi-UE data superposition transmission.

The present specification proposes a contention-based multiple access (MA) scheme. The proposed scheme includes an operating scheme based on hierarchical coding and modulation in the contention-based MA. Hereinafter, the contention-based MA scheme will be described.

Figure 10:
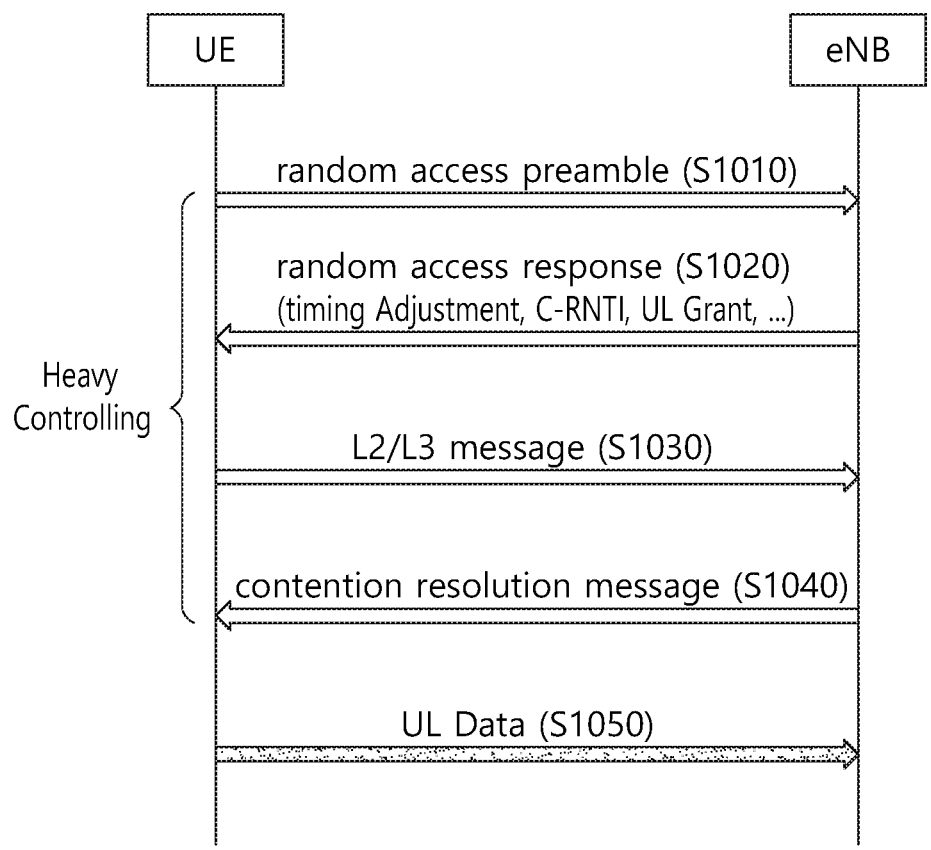
FIG. 10 shows a contention-based random access procedure in an LTE system.

FIG. 10 shows a contention-based random access procedure in an LTE system.

In a wireless communication system, the contention-based MA scheme shown in FIG. 10 is a typical technique. An uplink access scheme in an LTE communication system is shown in FIG. 10. In addition, the access scheme may be used in an ad-hoc network such as device to device (D2D) or vehicular to everything (V2X) and a cellular-based scheme such as LTE-advanced (LTE-A) or machine type communication (MTC).

The contention-based MA scheme starts when a scheduling request (SR) is performed from a UE to an eNB (S1010), and scheduling information of the eNB is received (S1020). Scheduling information received from the eNB includes timing adjustment or timing advance (TA) for synchronization between signals received from multiple users, a cell, ID, and a grant (e.g., it is transmitted through a PDCCH as control information including MCS level information or resource allocation information) for uplink access. In general, a communication system is a communication system in which limited radio resources are used by multiple UEs. However, since one UE cannot know a state of another UE, there may be a case where the multiple UEs request for resource allocation with respect to the same resource. Accordingly, the eNB resolves collision of resources requested by the multiple UEs in one contention, and transmits information thereof (S1040). In addition, the eNB and the UE transmit uplink data by exchanging control information for network access and HARQ (S1030).

Figure 11:
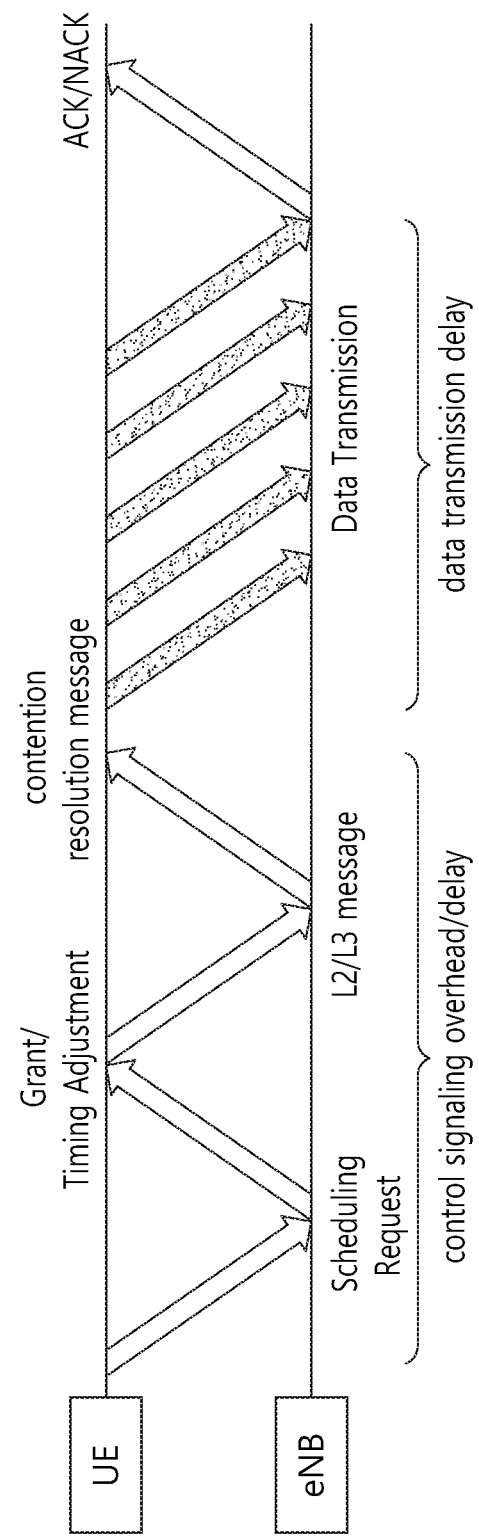
FIG. 11 shows a delay of control signaling and a delay of data transmission according to an uplink processing procedure in an LTE system.

FIG. 11 shows a delay of control signaling and a delay of data transmission according to an uplink processing procedure in an LTE system.

V2X, emergency service, machine control, or the like targeting an ultra-low latency service (ULLS) is considered in a next-generation wireless communication system. The ULLS has a very limited end-to-end (E2E) latency requirement and requires a high data rate. For example, E2E Latency<1 ms, DL Data Rate: 50 Mbps, UL Data Rate: 25 Mbps. In general, the E2E latency is determined by a network delay, a processing delay, and an air interface delay. The legacy contention-based multiple access scheme essentially requires heavy controlling as shown in FIG. 4, and thus has a long air interface delay. A delay of control signaling and a delay of data transmission are shown in FIG. 11 according to an uplink processing procedure of the legacy LTE system. Therefore, there is a need for a scheme capable of simplifying a control procedure for ULLS and effectively resolving contention, and a multiple access scheme capable of increasing a data transfer rate.

Accordingly, a scheme capable of simplifying a control procedure and resolving contention and a multiple access scheme and resource allocation scheme capable of increasing a data transfer rate are proposed for a low latency service of the next-generation wireless communication system.

In order to achieve the ULLS, a multiple access control scheme is proposed in which a control signaling procedure for multiple access is simplified and immediate data transmission of a UE is ensured.

In particular, in order to ensure the service, it is necessary to achieve: 1) a decrease in initial control signaling (timing advance (TA) and grant reception or the like) for UL transmission; and 2) a decrease in reception time of ACK/NACK for data transmission. A technique for enabling asynchronous control for multi-user transmission occurring when TA is not performed and uplink transmission without reception of an SR and a grant is proposed to achieve the condition 1). In addition, a technique for minimizing a traffic transfer completion time point of the UE is proposed to achieve the condition 2).

Method 1: Asynchronous Multiple Access Based on Control Signaling Reduction for Ultra-Low Latency In order to achieve the condition 1), it is assumed that each UE performs data transmission immediately without performing TA and scheduling from an eNB upon traffic generation based on data transmission. From a receiving eNB perspective, there may be a problem in that data reception of multiple users is not synchronized and a problem in that collision occurs between data of multiple users. Even if a multiple access scheme (e.g., Interleave Division Multiple Access (IDMA) or Sparse Code Multiple Access (SCMA), Power Level Non-Orthogonal Multiple Access (NOMA)) robust to an asynchronous property and data collision of multiple users is used, asynchronous data between multiple users at a receiver may make it difficult to distinguish between users and may be a cause of reducing a data decoding rate. Accordingly, there is a need for a multiple access scheme for asynchronous control.

The method 1 proposes a scheme of resolving an asynchronous problem between multiple users, which occurs due to a decrease in control signaling for supporting ULLS. When performing uplink transmission, UEs resolve the asynchronous problem, which occurs when initial control signaling is not performed, through pre-defined implicit timing. When traffic is generated based on uplink data transmission, the UEs provide asynchronous control by performing symbol-based synchronization from a transmission perspective through pre-defined periodic timing. In addition, a timing offset from a reception perspective is controlled to be within a cyclic prefix (CP) by performing user-grouping on UEs having a similar propagation delay time and by allocating the same resource zone. The user grouping is performed by an eNB according to a pre-defined timing distance, and the resource zone is allocated in advance to each user group. In this case, uplink data collision of synchronized UEs is identified through multi-user detection (MUD).

When the proposed method is used, synchronized uplink data can be transmitted without a TA and a grant, and uplink data collision occurring in this case can be identified through MUD.

For example, a pre-defined implicit timing scheme for asynchronous control is proposed. This may correspond to a method of removing a timing offset from a transmission perspective.

Figure 12:
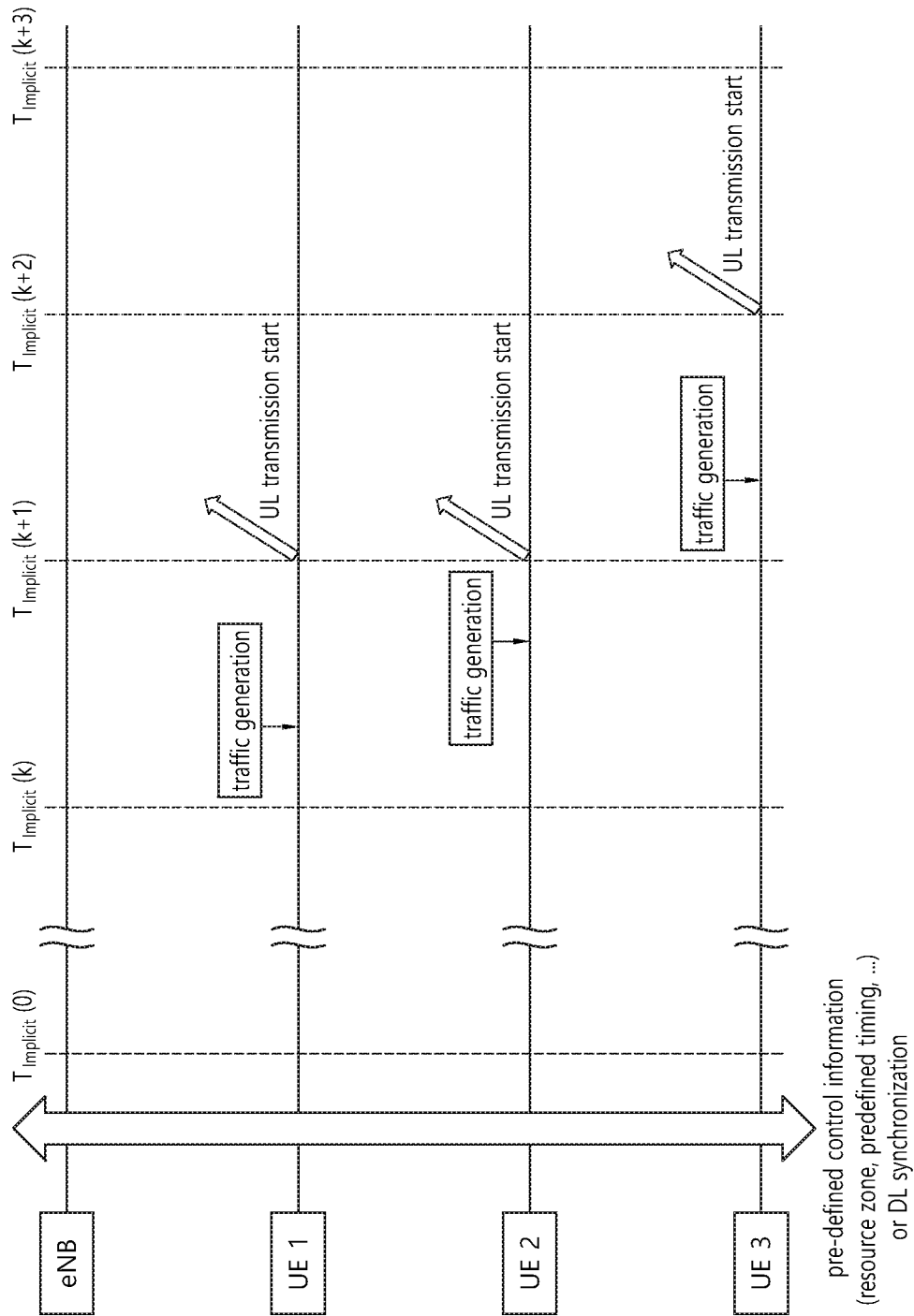
FIG. 12 shows an example of an asynchronous control operation through a pre-defined implicit timing scheme.

FIG. 12 shows an example of an asynchronous control operation through a pre-defined implicit timing scheme.

Referring to FIG. 12, it is assumed that an eNB and each UE (i.e., UE 1, UE 2, and UE 3) share pre-defined timing Pre-defined implicit timing is defined as a symbol unit, and a period thereof may differ depending on a symbol duration of a system environment. In this case, the pre-defined implicit timing indicates periodicity, and a period thereof may be defined variously such as a symbol, a sub-frame, a frame, or the like. A UE which requires immediate data transmission transmits information regarding pre-defined implicit timing which is closest from a time point thereof. Herein, the pre-defined implicit timing may be agreed from downlink synchronization, or may be agreed as absolute time in advance through pre-defined control information between the eNB and all UEs. However, the pre-defined implicit timing may be defined as $T_{Implicit}(N)=T+T_{symbol}*N$ on the basis of an absolute time reference T. Herein, $N=0, \ldots, \infty$. $T_{symbol}$ may be a symbol length, sub-frame length, or frame length including a CP length.

For example, as shown in FIG. 12, when traffic of the UE 1 and the UE 2 is generated between $T_{Implicit}(k)$ and $T_{Implicit}(k+1)$, uplink transmission starts at the closest pre-defined implicit timing $T_{Implicit}(k+1)$. Likewise, in case of the UE 3, when traffic is generated between $T_{Implicit}(k+1)$ and $T_{Implicit}(k+2)$, uplink transmission starts at the closest pre-defined implicit timing $T_{Implicit}(k+2)$.

Figure 13:
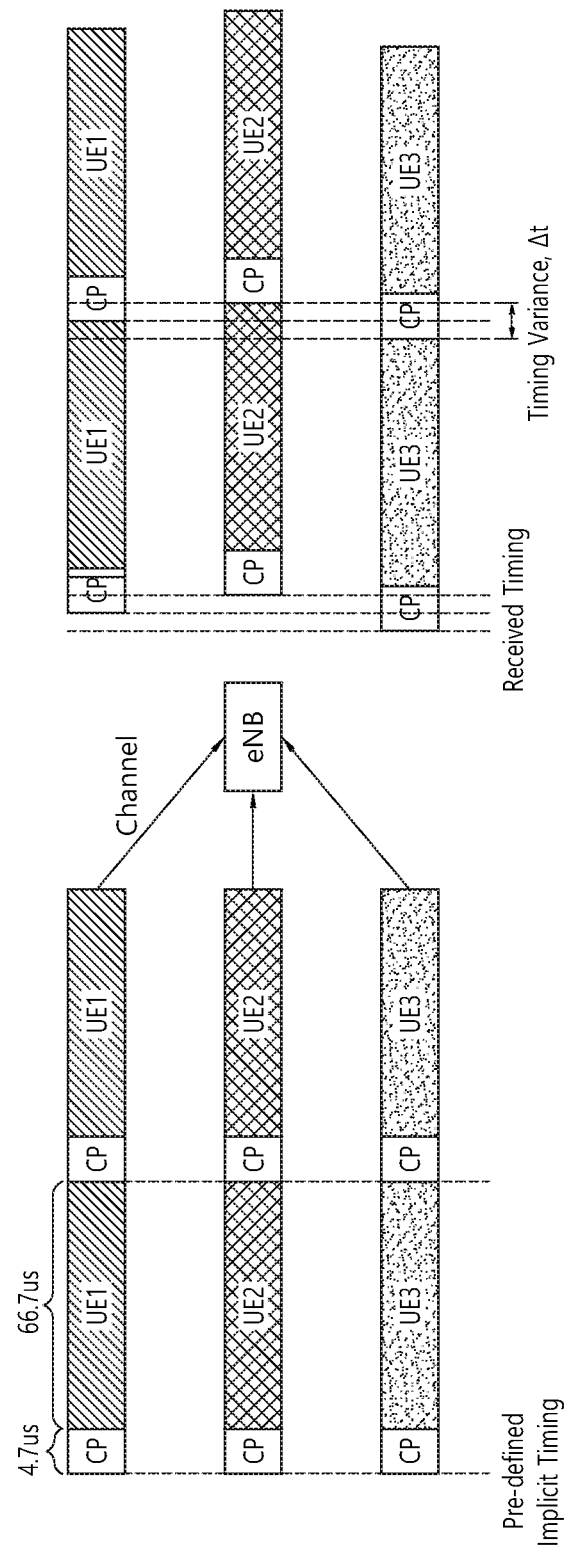
FIG. 13 shows an example of a timing operation of a transceiver through a pre-defined implicit timing scheme.

FIG. 13 shows an example of a timing operation of a transceiver through a pre-defined implicit timing scheme.

Since the pre-defined implicit timing maintains synchronization on a symbol basis, UEs 1, 2, and 3 may ensure symbol synchronization from a transmission perspective even if uplink traffic is generated at different time points as shown in FIG. 13. In this case, each UE may generate an uplink transmission latency of up to $T_{symbol}(=71.4\ us)$.

In this case, even if the transmission time point is maintained equally as shown in FIG. 13, a receiving eNB performs reception at a different timing according to a physical distance and a multi-path channel experienced by each UE. Therefore, the receiving eNB experiences a timing variance Δt of each UE. Accordingly, there is a need for a method for controlling Δt within a CP duration.

For another example, a user grouping and resource zone allocation scheme for asynchronous control is proposed. This may correspond to a method of controlling a timing offset within a CP from a reception perspective.

Figure 14:
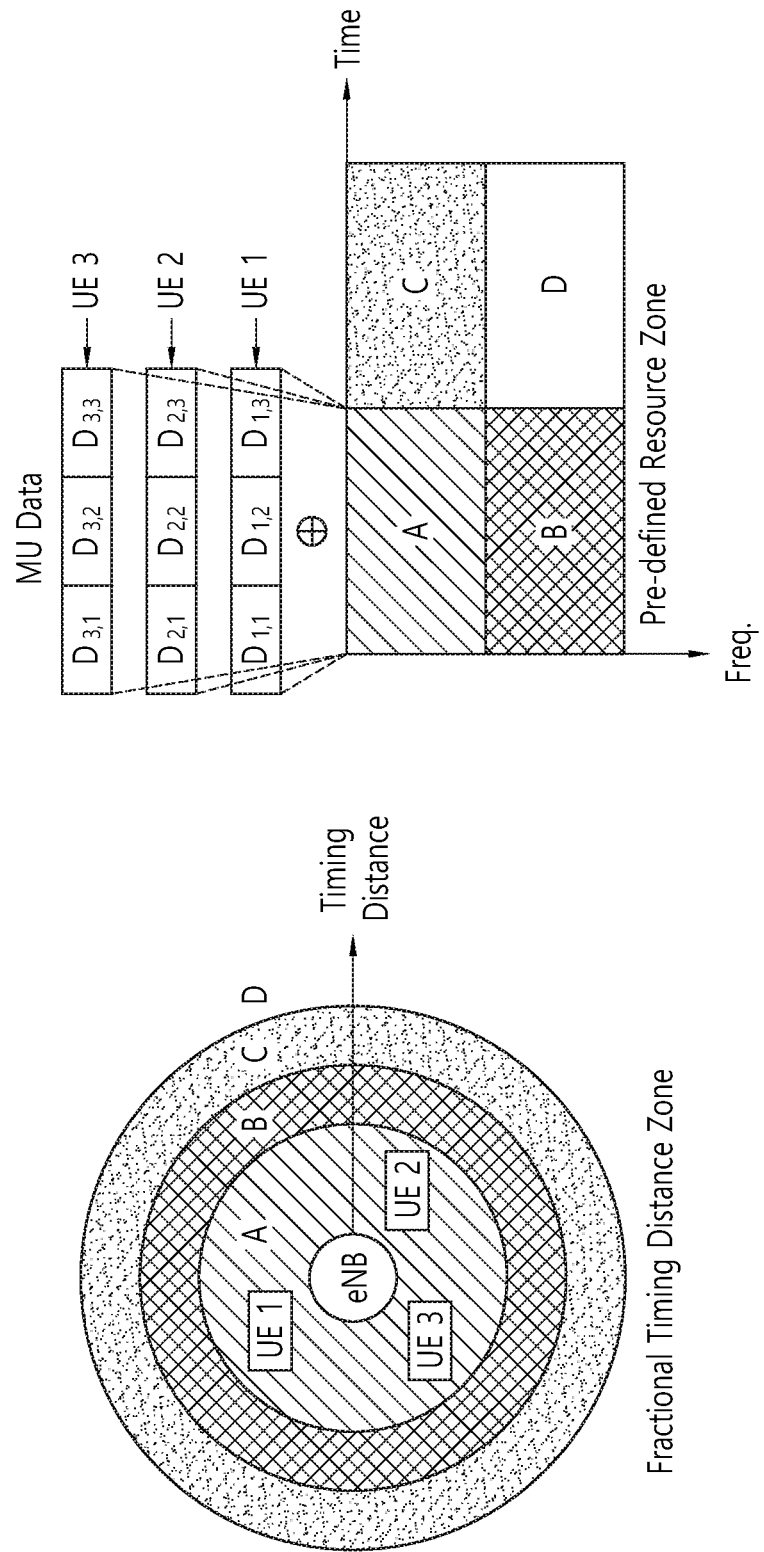
FIG. 14 shows an example of a user grouping and resource zone allocation scheme for asynchronous control.

FIG. 14 shows an example of a user grouping and resource zone allocation scheme for asynchronous control.

Referring to FIG. 14, an eNB receives information regarding a timing distance of a UE periodically or upon downlink transmission or uplink transmission of the UE. Herein, the timing distance is determined by not only a physical distance but also a system environment or a propagation delay caused by a multi-path of the UE. As shown in the left side of FIG. 14, the eNB may configure a fractional timing distance zone and perform user grouping by considering the timing distance between multiple users.

For example, if Δt is controlled with a CP duration, user grouping is performed by assuming that UEs of which a propagation delay time caused by a physical distance or a multi-path corresponds to 0–Δt are in a timing distance zone A. In a similar manner, user grouping is performed by assuming that UEs of which a propagation delay time corresponds to Δt−2*Δt are in a timing distance zone B. Therefore, one user group has a timing offset within a CP duration from a receiving eNB perspective. Herein, the timing variable Δt may be defined variously depending on a system environment (e.g., a cell radius or a CP duration or the like). In this case, as a magnitude of Δt decreases, a timing offset from a reception perspective decreases, whereas a timing distance zone is subdivided and the number of user group increases, which leads to an increase in complexity of a system operation. On the other hand, as the magnitude of Δt increases, a timing offset from a reception perspective increases, whereas simplicity of the timing distance zone and the number of user groups decrease, which leads to a decrease in complexity of the system operation. In addition, when Δt is set beyond CP, the receiving eNB may identify a signal through a rake receiver, and may detect a signal through inverse Fourier transform (IFT) for each individual signal. The user grouping is achieved periodically or upon downlink transmission or uplink transmission of the UE irrespective of immediate uplink data transmission of the UE.

For example, in the left side of FIG. 14, the eNB divides a timing distance zone into four steps A, B, C, and D through information regarding a timing distance of UEs, and allocates the UEs 1, 2, and 3 having similar timing distances to the timing distance zone A. Herein, a scheme of dividing the timing distance zone may control Δt of FIG. 14 within a CP duration. A condition of controlling Δt may vary depending on various carrier spacing and CP configurations. Therefore, when the eNB allocates the same resource zone to UEs allocated to the same timing distance zone, each UE may perform immediate uplink transmission by considering only pre-defined implicit timing irrespective of timing of another user or UL grant/time advance from the eNB. Even if timing of a resource block differs in immediate uplink transmission of each UE, symbol timing within a CP duration may be ensured.

In FIG. 14, the pre-defined resource zone may vary depending on a system environment or the number of users to be connected to the eNB. For example, in FIG. 14, a pre-defined resource zone may be configured according to a fractional timing distance zone, and the pre-defined resource zone may be divided in a time division, frequency division, and time-frequency division manner. Herein, in case of time division, it may be divided variously such as a symbol, a slot, a sub-frame, a frame, or the like, or division may not be achieved. Similarly, in case of frequency division, it may be divided variously such as a sub-carrier, a sub-band, a total-band, or the like, or division may not be achieved. Herein, when it is said that division is not achieved, this means that the entire resources can be used.

In FIG. 14, the UEs 1, 2, and 3 of the same timing distance zone A share the entirety of the same resource zone by performing uplink transmission to the resource zone A. Therefore, since UEs performing uplink transmission in the same resource zone perform uplink transmission with the same resource, a receiving eNB must identify data of the UEs. A multiple access technique capable of multi-user detection (MUD) may be utilized to identify multi-user data. For example, IDMA, SCMA, Power Level NOMA, or the like may be utilized.

Method 2: Time-Frequency Resource Sharing Based on Asynchronous Multiple Access for Ultra-Low Latency In order to achieve the condition 2), each UE must minimize a latency from a UL traffic generation time point to a traffic transmission completion time point. In order to minimize the latency, each UE needs to start data transmission simultaneously with UL traffic generation through as many resources as possible. Accordingly, there is a need for a scheme of performing immediate data transmission without a loss of a decoding rate while multiple users share limited resources.

The present specification proposes a scheme of minimizing immediate data transmission start and traffic transmission completion time points in a multi-user access scheme of sharing limited resources. UEs having different UL transmission requests and traffic sizes perform UL transmission through a multiple access scheme in which MUD is possible, by considering only pre-defined implicit timing mentioned in the method 1. Since users in the resource zone of the method 1 have a timing offset within a CP, UL transmission is performed without considering other users' timing or resource occupation. Then, a receiving eNB performs MUD at a symbol level. The MUD scheme may vary depending on the multiple access scheme, and signals of multiple users are identified through successive interference cancelation (SIC) or parallel interference cancelation (PIC) or the like as an iterative decoding scheme. In addition, a latency from an air interface perspective decreases through a variable configuration of a limited resource zone.

When the proposed method is used, immediate data transmission can be performed without a loss of a decoding rate while multiple users share limited resources.

For example, a UL transmission scheme between multiple UEs on the basis of a frequency spread resource configuration is proposed.

Figure 15:
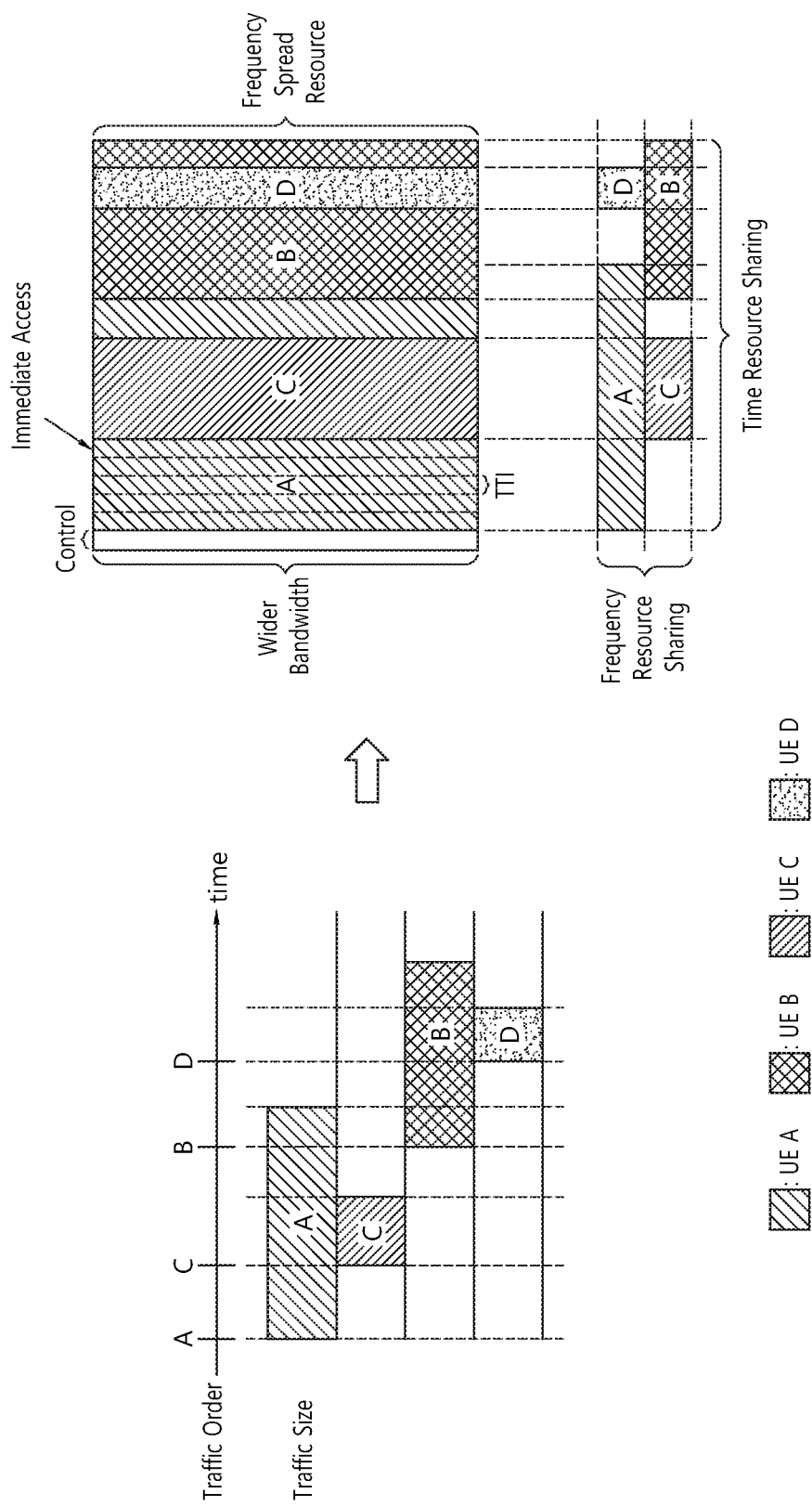
FIG. 15 shows an example of an uplink transmission scheme between multiple UEs on the basis of a frequency spread resource configuration.

FIG. 15 shows an example of an uplink transmission scheme between multiple UEs on the basis of a frequency spread resource configuration.

A UL transmission scheme of multiple UEs for minimizing a traffic transmission completion time point is exemplified in FIG. 15 on the basis of a frequency spread resource configuration. UEs having different UL transmission requests and traffic sizes perform UL transmission through a multiple access scheme in which MUD is possible, by considering only the aforementioned pre-defined implicit timing. For example, when a UE A in which a UL transmission request first occurs performs transmission, a UE C performs UL transmission to the same resource zone. In the same manner, when its transmission request occurs, each UE performs UL transmission without considering other users' timing or resource occupation. Then, a receiving eNB performs MUD at a symbol level. The MUD scheme may vary depending on the multiple access scheme, and signals of multiple users may be identified through successive interference cancelation (SIC) or parallel interference cancelation (PIC) or the like as an iterative decoding scheme.

In the multiple access scheme of the method 2, a resource can be utilized variably since multiple UEs perform UL transmission by sharing the same resource zone. In order to achieve a low latency from an air interface perspective as shown in FIG. 15, an RB or a sub-band may be configured with a smaller transmission time interval (TTI) and a wider sub-carrier or bandwidth. For example, a sub-carrier spacing 15 kHz of a legacy LTE system may be extended, and thus there may be a change in a symbol duration through various sub-carrier configurations such as 30 KHz, 60 KHz, or the like, and even if there is a change in the sub-carrier spacing, it is apparent that the multiple access scheme proposed in the method 2 can be utilized. Likewise, even if various RB units are configured such as 10 RB units, 14 RB units, or the like in 12 sub-carriers, it is apparent that the aforementioned multiple access scheme can be utilized. In a similar manner, the sub-band may also be configured variably.

For example, in FIG. 15, if traffic of the UE A is generated at a time $t_A$ with a traffic amount which can be transmitted during a unit time $T_A$, when scheduling is performed through SC-FDMA or the like of the legacy LTE, a transmission completion time may be expressed such as $t_{ACK}=t_A+t_{control}+T_A/N_{carrier}/N_{symbol}$. Herein, $t_{control}$ is a scheduling control time of TA and grant reception or the like. $N_{carrier}$ and $N_{symbol}$ are frequency and time resources that can be used by the UE A. On the other hand, if the conditions 1) and 2) are achieved according to the multiple access scheme proposed in the methods 1 and 2, the transmission completion time may be expressed such as $t_{ACK}=t_A+t_{Implicit}+T_A/(N_{carrier}*N_{user})/N_{symbol}$. Accordingly, although a traffic generation time $t_A$ is identical, as shown in FIG. 13, it is apparent that $t_{Implicit} \ll t_{control}$. According to the legacy LTE, a maximum value of $t_{Implicit}$ is 71.4 us, and $t_{control}$ is 4-8 ms. In addition, since the UE A can occupy all time frequency resources in the resource zone, the transmission time $T_A$ may be decreased in proportion to the number of occupying UEs. In case of FIG. 15, since the number of occupying UEs is 4, a transmission time can be decreased to $T_A/4$. The aforementioned example may vary depending on variable utilization of resources, and there may be a difference in the time decrease according to a parameter change of a channel coding scheme considering a decoding rate decrease caused by multiple access.

In the proposed frequency spread resource scheme, if the number of UEs which perform simultaneous transmission increases, a decoding rate decreases due to a decrease in MUD performance, and a retransmission request may be performed. Therefore, a level of frequency spread resource needs to be changed adaptively according to the number of UEs to be simultaneously connected. For example, if a maximum value of simultaneous transmission of the multi-user superposition access scheme in use is 4, when simultaneous transmission is performed by four users, a current resource zone is bisected in a frequency domain to enable simultaneous transmission of up to 8 users. The frequency division information is broadcast with an indication bit, and is informed to UEs which use the current resource zone. The UEs continuously perform UL transmission on the basis of the received indication bit.

Method 3: Asynchronous Multiple Access Based Signal Flow for Ultra-Low Latency

A signal flow from a transceiver perspective is required in order to perform the methods 1 and 2.

The present method proposes a signal flow from a transceiver perspective for performing the multi-user access scheme proposed in the methods 1 and 2. A candidate group of a resource zone to be used in UL transmission and control information for multi-user data transmission are previously allocated to each UE by an eNB belonging thereto through pre-defined control information. Each UE transmits an essential control message to the eNB upon generation of UL traffic, and immediately performs data transmission irrespective of UL transmission of another user without any control from the eNB. Upon receiving control information of the eNB without completion of data transmission, data may be transmitted by changing a data transmission scheme according to the received control information.

When the proposed method is used, immediate data transmission is possible without having to wait for control information reception of the eNB upon generation of UL data traffic of the UE.

For example, a signal flow for ULLS is proposed from a single user perspective.

Figure 16:
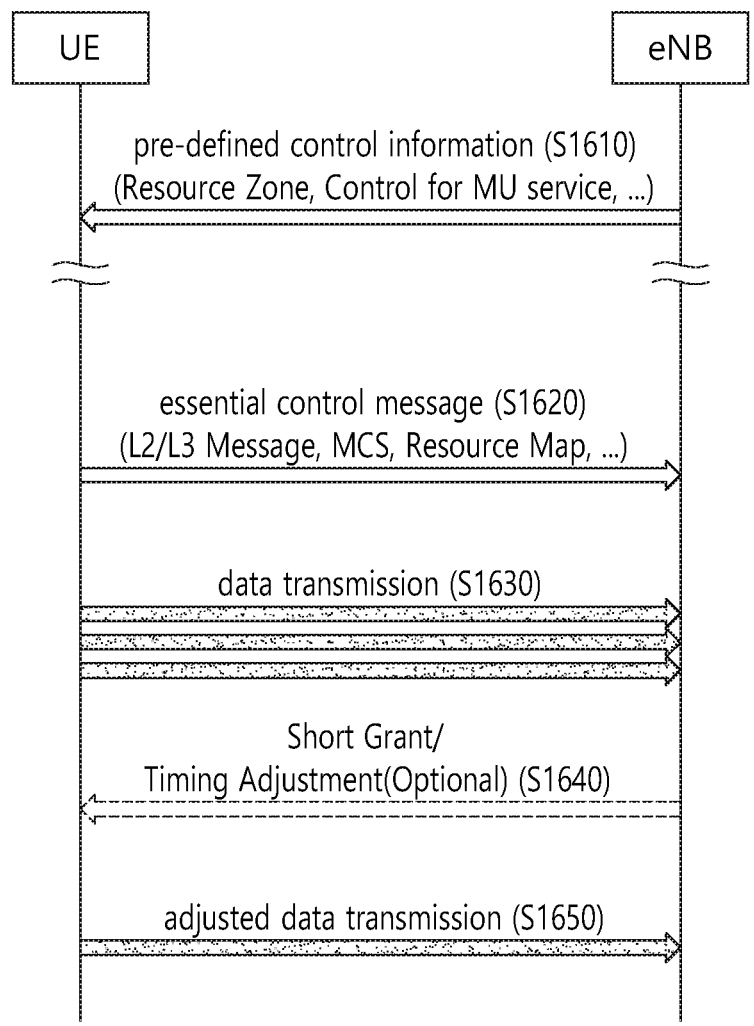
FIG. 16 is a flowchart showing a procedure of transmitting/receiving a signal for ULLS from a single user perspective.

FIG. 16 is a flowchart showing a procedure of transmitting/receiving a signal for ULLS from a single user perspective.

Conditions 1) and 2) for ULLS can be achieved by the methods 1 and 2, and the uplink procedure of FIG. 11 may change as shown in FIG. 16.

In a structure of FIG. 16, a control signaling procedure of the legacy multiple access scheme is simplified, and immediate data transmission of a UE is performed. It is assumed that a candidate group of a resource zone to be used in UL transmission and control information for multi-user data transmission are allocated in advance to each UE by an eNB belonging thereto (S1610). Herein, the resource zone may be allocated based on a timing distance zone as shown in FIG. 14. According to a system environment, a resource allocated for UL transmission may be configured in a divided manner, or may be configured as one zone without being divided. When one time-frequency resource is used by multiple users, control information for multi-user data transmission is essential control information of a multiple access scheme for identifying this. For example, there may be a user-specific interleaver scheme or index of IDMA, or a codebook scheme or codeword index of SCMA, a power control scheme or power level of power level NOMA, or the like. Herein, as long-term control information, pre-defined control information or the like of FIG. 12 may be irrelevant to generation of UL information transmission traffic.

Upon generation of traffic of data transmission, each UE transmits only essential control information for network access (S1620), and transmits data immediately without grant reception or timing advance (S1630). As shown in FIG. 16, L2/L3 messages for network access, a modulation and coding scheme (MCS) level previously used, resource map information currently being used, or the like may be included as the essential control information. Transmission of the essential control information is a small amount of information which may affect a decoding rate of subsequent data transmission, and may need to be transmitted by considering repetition or a fixed MCS level capable of ensuring a high decoding rate. In this case, an MCS level or power control of each user is determined autonomously by the UE on the basis of CQI information in a long-term perspective. For example, each user may perform the MCS level and power control on the basis of PDCCH information or DL RSSI information of a previous time. Alternatively, data may be transmitted with a relatively lower level than an MCS level for UL transmission of a previous time and with a higher level than a power level for UL transmission of the previous time, thereby increasing reception reliability.

Regarding an initially determined MCS level and power level, after immediate data transmission, MCS/power level adjustment and synchronization may be performed based on timing advance and a short grant received through a PDCCH during a persistent data transmission time. For example, in FIG. 16, each UE transmits essential control information without scheduling between multiple users upon generation of data transmission traffic (S1620). In addition, data is continuously transmitted without any control of the eNB (S1630). Upon receiving the essential control information, the eNB transmits MCS/power level control information and timing advance information to each UE on the basis of a current UL resource state and timing information (S1640). Each UE which has continuously transmitted data without any control changes an MCS/power level from a time point of receiving control information of the eNB, and continuously transmits data by performing timing advance (S1650). In this case, an indication bit of frequency division may be received for the resource zone of the method 2. Control information transmission/reception of the eNB may be a selective method.

For another example, a signal flow for ULLS is proposed from a multi-user perspective.

Figure 17:
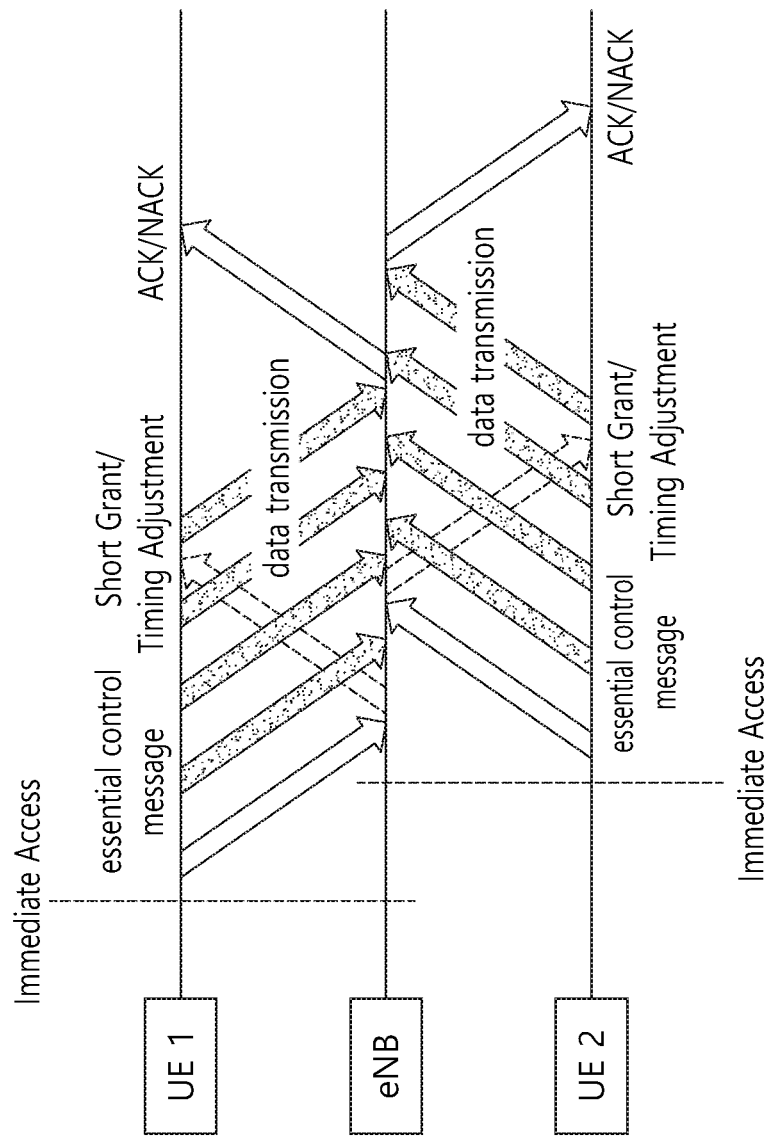
FIG. 17 is a flowchart illustrating a procedure of transmitting/receiving a signal for ULLS from a multi-user perspective.

FIG. 17 is a flowchart illustrating a procedure of transmitting/receiving a signal for ULLS from a multi-user perspective.

Signaling for ULLS based on the multiple access scheme proposed in the method 3 is exemplified in FIG. 17. In a multi-user case, it is apparent that the conditions 1) and 2) can be achieved through the scheme of the method 3, and data transmission can be performed immediately after UL traffic is generated to be robust to an asynchronous property. An eNB persistently decodes data of UEs corresponding to a resource zone, and upon recognizing decoding success or data reception, may perform additional control signaling for maintaining connection with the UE.

Hereinafter, a method of designing a contention zone for contention-based multiple access is described.

A sequence, codeword, or the like described in the present specification refers to a frequency or time-axis complex vector used to classify multiple users in NOMA. The complex vector may have orthogonal or non-orthogonal properties depending on a configuration. In addition, the complex vector may be represented by a single scalar value according to the configuration of the complex vector. In this case, it may be matched with the existing single resource single information transmission. Spreading mentioned in the present specification refers to frequency or time-axis spreading, and the complex vector is used in the spreading. In addition, according to the configuration of the complex vector and a resource allocation scheme, transmission may be achieved with superposition in the same resource region or single transmission may be achieved without superposition.

Figure 18:
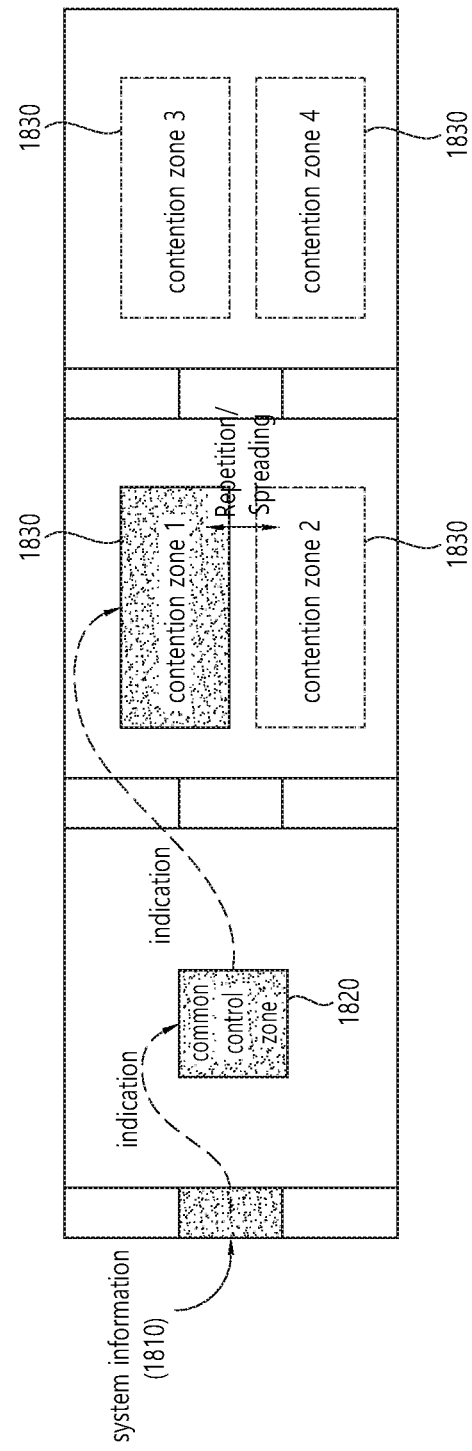
FIG. 18 shows an example of a resource zone for performing contention-based uplink connection and a resource zone for transmitting contention-based uplink data according to an embodiment of the present specification.

FIG. 18 shows an example of a resource zone for performing contention-based uplink connection and a resource zone for transmitting contention-based uplink data according to an embodiment of the present specification.

It is assumed in the present specification that a contention zone 1830 for contention-based UL connection or UL data transmission is broadcast to UEs on the basis of NOMA. For example, the UE performs downlink synchronization through a DL synchronization signal (e.g., PSS and SSS of LTE, a DL synchronization signal proposed in new RAT, or the like). The UE receives system information (system information (SI) 1810, for example, MIB information through PBCH of LTE, SIB in formation through PDSCH, or to-be-broadcast system information proposed in new RAT) on the basis of downlink synchronization. The synchronization signal and the SI 1810 may be broadcast through a common control zone 1820, and all UEs may decode the synchronization signal and the SI 1810.

Through the SI, the UE may recognize a resource region for performing contention-based UL connection and a resource region for performing contention-based UL data transmission. For example, through the SI 1810, a resource index corresponding to the common control zone 1820 may be indicated, or it may be agreed to use a fixed resource in advance. In this case, RNTI (e.g., RNTI for an identification of a contention zone) for decoding the common control zone 1820 may be newly defined, and this is agreed in advance. Through the control information transmitted to the common control zone 1820, a resource index corresponding to the contention zone 1830 may be indicated, or it may be agreed in advance to use a fixed resource. The method may enable transmission also in case of a UE which is not in a connected state, that is, a UE in an idle state. Of course, information on the common control zone may be informed to UEs in the connected state through RRC instead of system information.

In FIG. 18, an x-axis direction is exemplified as a time domain, and a y-axis direction is exemplified as a frequency domain.

A contention zone type may be classified into: 1) a random access zone for UL connection (e.g., a PRACH zone of LTE or a xPRACH zone of new RAT); 2) a scheduling request zone for allocating a UL data transmission region (an SR zone of LTE or an xSR zone of new RAT); 3) a UL control zone for UL control transmission (a PUCCH zone of LTE, or an xPUCCH zone of new RAT); and 4) a UL data zone for UL data transmission (a PUSCH zone of LTE or an xPUSCH zone of new RAT). Herein, it is assumed in the following description that the contention zone is usually used for the case 4).

Hereinafter, a method of operating a contention-based multiple access scheme on the basis of hierarchical coding and modulation is described.

Figure 19:
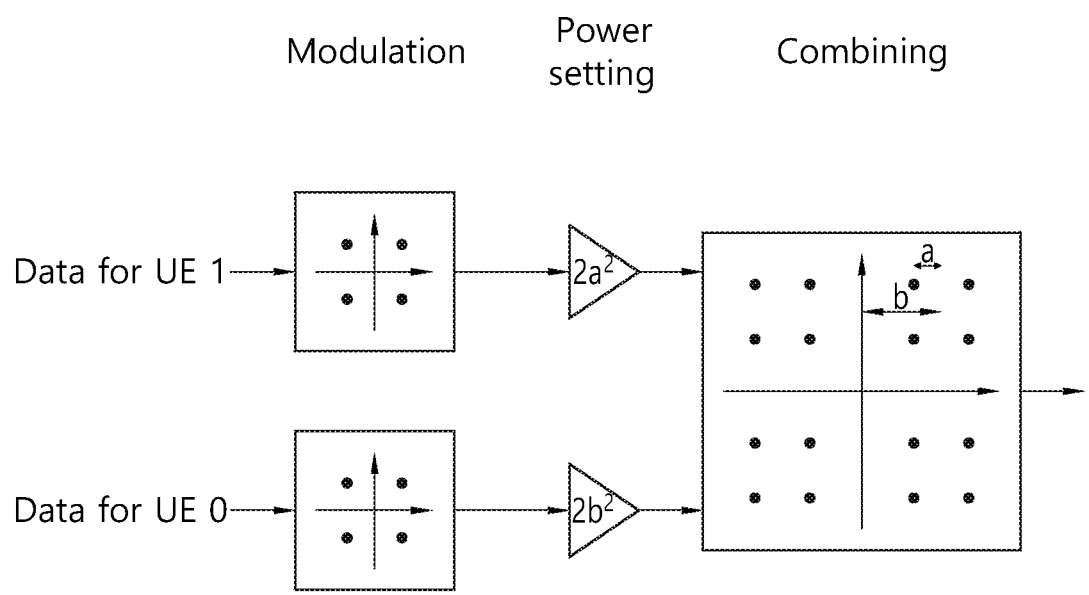
FIG. 19 is a concept view showing an example of hierarchical modulation.

FIG. 19 is a concept view showing an example of hierarchical modulation.

Referring to FIG. 19, hierarchical modulation (HM) will be briefly described.

The HM may be referred to or expressed as layered modulation.

The HM is one of techniques for multiplexing and modulating a plurality of data streams into one symbol stream. Herein, base layer sub-symbols and enhancement layer sub-symbols are synchronized together and superimposed before being transmitted.

When the HM is applied, a user (or user terminal) having an enhanced receiver and good reception quality may demodulate and decode at least one data stream.

A user terminal having a legacy receiver or poor reception quality may demodulate and decode only a data stream transmitted in a base layer having a low coding rate and/or a low modulation order.

From an information-theory perspective, the HM is treated as one practical implementation in superposition precoding, and is proposed to achieve a maximum sum rate of a Gaussian broadcast channel having successful interference cancellation at a receiving end (or receiver).

From a network operation perspective, when the HM is applied, a network operator may persistently target user terminals having different services or QoS.

However, due to inter-layer interference (ILI), the conventional HM experiences a decrease in a ratio that can be achieved by a base layer data stream because of interference from high layer signal(s).

For example, for two-layer symbols subjected to the HM and including a 16QAM base layer and a QPSK enhancement layer, a throughput loss caused by the ILI in the base layer may increase up to about 1.5 bits/symbol when a total reception signal-to-noise ratio (SNR) is about 23 dB. This means that a loss of a throughput that can be achieved at the 23 dB SNR in the base layer is about 37.5%(1.5/4). On the other hand, a demodulation error rate of any one of base layer and enhancement layer symbols also increases.

Figure 20:
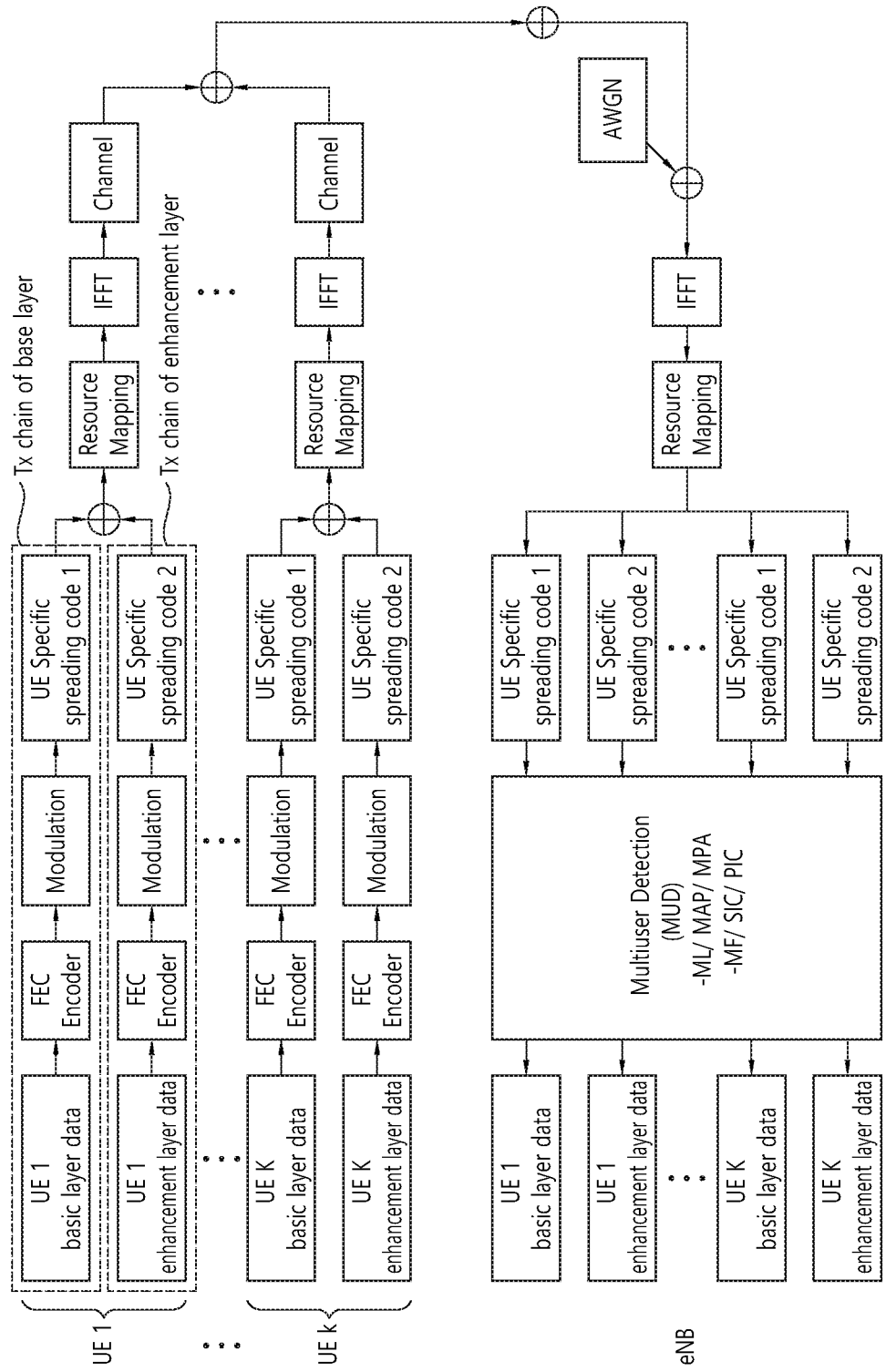
FIG. 20 is a block diagram showing an example of transmission/reception for a NOMA scheme to which hierarchical modulation is applied according to an embodiment of the present specification.

FIG. 20 is a block diagram showing an example of transmission/reception for a NOMA scheme to which HM is applied according to an embodiment of the present specification.

The present specification describes a scheme in which multi-user information is transmitted in a superposed manner on the basis of the contention zone of FIG. 18. A single user may transmit a contention-based resource that can be utilized in a given contention zone through a single layer (using a single contention resource) or multiple layers (using multiple contention resources). Herein, the contention-based resource may be configured with FDM, TDM, CDM, or the like.

Each layer may be classified into a base layer and an enhanced layer by assuming a hierarchical layer. The base layer may assume a low rate coding rate and/or a low modulation order, and the enhanced layer may assume a high rate coding rate and/or a high modulation order. Therefore, the base layer has a high detection (or decoding) success rate with respect to contention-based transmission, and the enhanced layer has a relatively low detection (or decoding) success rate with respect to contention-based transmission. A block diagram of transmission (Tx)/reception (Rx) for the NOMA scheme to which the hierarchical coding/modulation is applied may be as shown in FIG. 20.

Referring to FIG. 20, each user (UE 1, . . . , UE k) performs base layer transmission and enhancement layer transmission through two Tx chains (a Tx chain of the base layer and a Tx chain of the enhanced layer).

Herein, the base layer uses a UE specific spreading code by using a low coding rate and/or a low modulation order. For example, the UE 1 configures the base layer by using a UE 1 specific spreading code 1.

The enhancement layer uses the UE specific spreading code by using a high coding rate and/or a high modulation order. For example, the UE 1 configures the enhancement layer by using a UE 1 specific spreading code 2. The UE 1 specific spreading code 1 and the UE 1 specific spreading code 2 are different from each other.

In the above case, a codeword for the base layer and the enhancement layer may be predefined. The aforementioned spreading code may be included in a predefined codeword. For example, it may be predefined such that, if the number of all codewords (all codewords included in a codebook) is 8, codeword indices 1 to 4 are used for the base layer, and codeword indices 5 to 8 are used for the enhancement layer. Alternatively, the codeword index may be predefined by being tied to a code rate for each user. The above example is summarized as shown in Table 3 below.

TABLE 3

| Layer | Code rate | Codeword Index |
| --- | --- | --- |
| Base Layer | 1/8 | 1, 3 |
| | 1/4 | 2, 4 |
| Enhancement Layer | 1/3 | 5, 7 |
| | 1/2 | 6, 8 |

Since a loop up table of Table 3 above is agreed in advance, a BS may estimate a code rate on the basis of a codeword index when performing blind detection. By recognizing the base layer, the BS may select a layer to be preferentially selected when performing SIC. For example, upon detecting a signal received from a UE, if a codeword index is 1, the BS may estimate that a code rate is 1/8, and may recognize that the signal has been transmitted through the base layer. Therefore, the BS may preferentially decode the base layer when performing SIC.

In addition to the code rate exemplified above, a modulation and coding scheme (MCS) may be related to a codeword index of the base layer/enhancement layer as shown in Table 3.

In addition, the BS may predefine or broadcast an MCS set to be used in the base layer and the enhancement layer to all UEs. For example, it may be restricted such that the base layer uses MCSs 0 to 4, and the enhancement layer uses MCSs 5 to 31. A moving average (MA) signature including the remaining codewords may be randomly selected by the UEs.

Hereinafter, a case where a single user has access in one contention zone and a case where multiple users have access in one contention zone are described separately.

(1) Single UE Transmission Case in a Contention Zone

Herein, single user access is assumed in one contention zone. A single user achieves a low data rate through a base layer and a high data rate through an enhancement layer, when the aforementioned multi-layer transmission is performed. The base layer can achieve a high detection success rate on the basis of only a channel estimation and decoding process. Then, channel estimation performance is improved for the enhancement layer transmitted on the same resource in a superposed manner on the basis of decoded data of the base layer. Herein, as a known sequence, the decoded data of the base layer may be reused in channel estimation for decoding of the enhancement layer. Decoding performance for the enhancement layer may be improved on the basis of the improved channel estimation performance.

(2) Multiple UE Transmission Case in a Contention Zone

Herein, multi-user access is assumed in one contention zone. For convenience of explanation, two users A and B are assumed. Each user transmits a base layer assuming a low rate coding rate and/or a low modulation order and an enhancement layer assuming a high rate coding rate and/or a high modulation order in a superposed manner as mentioned in (1) above. Therefore, the base layer and enhancement layer of each user is transmitted in a receiving end (BS), and thus at least four layers are received in a superposed manner. As mentioned above, the base layer has a high detection (or decoding) success rate with respect to contention-based transmission, and the enhancement layer has a relatively low detection (or decoding) success rate with respect to contention-based transmission. Therefore, as mentioned in (1) above, on the basis of the high detection (or decoding) success rate of the base layer, the decoded data of the base layer is utilized as a known sequence to improve the decoding (or detection) success rate of the enhancement layer. However, since multiple users perform contention-based transmission in one contention zone, collision may occur for the same contention resource. Therefore, this can be summarized by the following four cases Herein, it is assumed that each user has the same resource and power allocation for the base layer and enhancement layer, and is around the same geometry area. In addition, it is assumed that the base layer has a low data rate or transmission block size allocation rate (rate_1), so that it can be decoded at a low signal to interference plus noise ratio (SINR). It is also assumed that the enhancement layer has a high data rate or transmission block size allocation rate (rate_2), so that it can be decoded at a high SINR. Herein, if multiple users have different geometries, each user may transmit only a single layer (only a base layer) or may transmit all of multiple layers according to an SINR value based on the geometry.

1) When only a user 1 attempts with probability of p and a user 2 mutes with probability 1−p, an achievable data rate is rate_1+rate_2 and thus the average system data rate by only the user 1 is p*(1−p)*(rate_1+rate_2).

2) When only the user 2 attempts with probability of p and the user 1 mutes with probability 1−p, the achievable data rate is rate_1+rate_2 and thus the average system data rate by only the user 2 is p*(1−p)*(rate_1+rate_2).

3) When both the user 1 and the user 2 attempt with probability of p, each achievable data rate is rate_1 and thus the average system data rate by the user 1 and user 2 is p*p*(rate_1+rate_1).

4) When both the user 1 and the user 2 mute with probability of 1−p, each achievable data rate is 0 and thus the average system data rate is (1−p)*(1−p)*0.

So, the overall average system data rate=2*p*(1−p)*(rate_1+rate_2)+2*p*p*(rate_1). In the analysis above, the rate_1 and rate_2 of the two users may be different according to a superposition scheme, a resource allocation scheme, and a power allocation scheme, and a higher overall average system data rate can be achieved through optimization. In addition, due to a geometry difference of the two users, there may be a difference in an overall average system data rate that can be achieved. In addition, when N users perform contention on the same contention resource in the same contention zone, it may be extendedly applied as follows: comb(N,1)*p*(1−p)^(N−1)*(rate_1+rate_2)+comb(N,2)*p^2*(1−p)^(N−2)*(2*rate_1).

On the basis of the analysis above, a hierarchical coding/modulation scheme in contention based transmission may be utilized in channel estimation of an enhancement layer, repetition of the enhancement layer, retransmission for previous transmission, or the like as described below.

As mentioned in (1) above, on the basis of the high detection (or decoding) success rate for the base layer of each user, the decoded data of the base layer of each user may be utilized as the known sequence to improve the decoding (or detection) success rate of the enhancement layer of each user.

The enhancement layer can transmit more data bits than those of the base layer. Therefore, some data bits (or all data bits) of the enhancement layer of each user may be utilized as enhanced redundancy bits.

Herein, the enhanced redundancy bits may be utilized with a low rate or repetition for a high decoding (or detection) success rate of the enhancement layer, and may be utilized for detection or decoding performance of the base layer.

Herein, the enhanced redundancy bits may be utilized as enhanced redundancy bits for additional data transmission with respect to the base layer, and may be utilized as encoded CRC bits with respect to the base layer.

In previous transmission, redundancy bits of the enhancement layer for current transmission may be utilized for retransmission with respect to failed transmission of the base layer. The operation above may be performed after receiving NACK in HARQ. Irrespective of an HARQ operation, a redundancy bit of the enhancement layer may be used statically to retransmit the base layer of the previous transmission. It can be expected that a collision probability is decreased with two transmission attempts according to user traffic generation. Herein, since high data rate transmission may be possible in the enhancement layer, the operation may be performed in every transmission, or retransmission of the base layer may be collectively performed for several previous transmission attempts periodically according to a specific value.

The base layer may perform transmission by containing information (C-RNTI, etc.) for a UE identification, and the enhancement layer may transmit traffic data of the UE, thereby switching to an HARQ processor or grant-based transmission through the UE identification. If the BS has detected the UE identification but fails in data detection, since the BS can know which UE transmits data through the UE identification, data retransmission may be requested to the UE which has transmitted the data. If the UE retransmits the data, the BS may combine and decode the previous UE identification of the base layer and the retransmitted data of the enhancement layer. Herein, the UE identification and the data are transmitted through different layers in one data channel (e.g., PUSCH).

In an environment where the number of DMRSs is less than the number of codewords, the base layer and enhancement layer for one user are tied to one DMRS. Therefore, two codewords (respectively for the base layer and the enhancement layer) may be used with one DMRS. Since the base layer and the enhancement layer are transmitted by a single user in a superposed manner in all of the above operations, channel estimation may be performed through one reference signal. Accordingly, even if the number of reference signals is less than the number of codewords, channel equalization and MUD may be performed in a receiving end.

For example, it is assumed that the number of DMRSs is 4, and the number of codewords is 8. In addition, it is assumed that the DMRSs are orthogonal to each other in order to effectively perform channel estimation. Since contention-based data transmitted from multiple users is identified with the DMRS, channel estimation performance has conventionally been determined according to the number of DMRSs even if the number of codewords is greater than the number of DMRSs. Therefore, MUD performance has not been ensured. However, even if the number of codewords is greater than the number of DMRSs, in a case where the base layer and enhancement layer for one user are tied to one DMRS, 8 layers can be identified when the number of DMRSs is 4. Therefore, there is an advantage in that the number of available codewords can be more increased. That is, it is possible to support 1:M mapping between the DMRS and the codeword index. Herein, M is the number of spreading codewords corresponding to one DMRS.

A relation of 1:M mapping between the DMRS and the codeword index may be pre-defined, or may be informed through RRC signaling or broadcasting or the like using a common control channel. For example, codeword selection satisfies the following relation: DMRS_INDEX=[(Codeword_INDEX)/M](=ceil(Codeword_INDEX/M)). Herein, M=(Maximum Codeword_INDEX)/(Maximum DMRS_INDEX). For example, if the maximum number of codewords is 8 and the maximum number of DMRSs is 4, according to DMRS_INDEX, Codeword_INDEX is 1 or 2 when DMRS_INDEX is 1, and Codeword_INDEX is 3 or 4 when DMRS_INDEX is 2.

In all of the aforementioned operations, the base layer and the enhancement layer may have different power allocation. When a total power constraint of the UE is fixed to A, it is configured such that a sum of power B of the base layer and power C of the enhancement layer is C (A=B+C). Accordingly, channel equalization is performed based on the power allocation also in channel equalization of the receiving end. Basically, power allocation of each of the base layer and the enhancement layer may be evenly allocated with A/2, and may be controlled by the BS if power allocation of the base layer and the enhancement layer is performed with a different power ratio. In this case, control information from the BS to the UE may be indicated through RRC level signaling, high layer information, or common control information. That is, power allocation of the base layer and the enhancement layer may be signaled from the BS to the UE.

Figure 21:
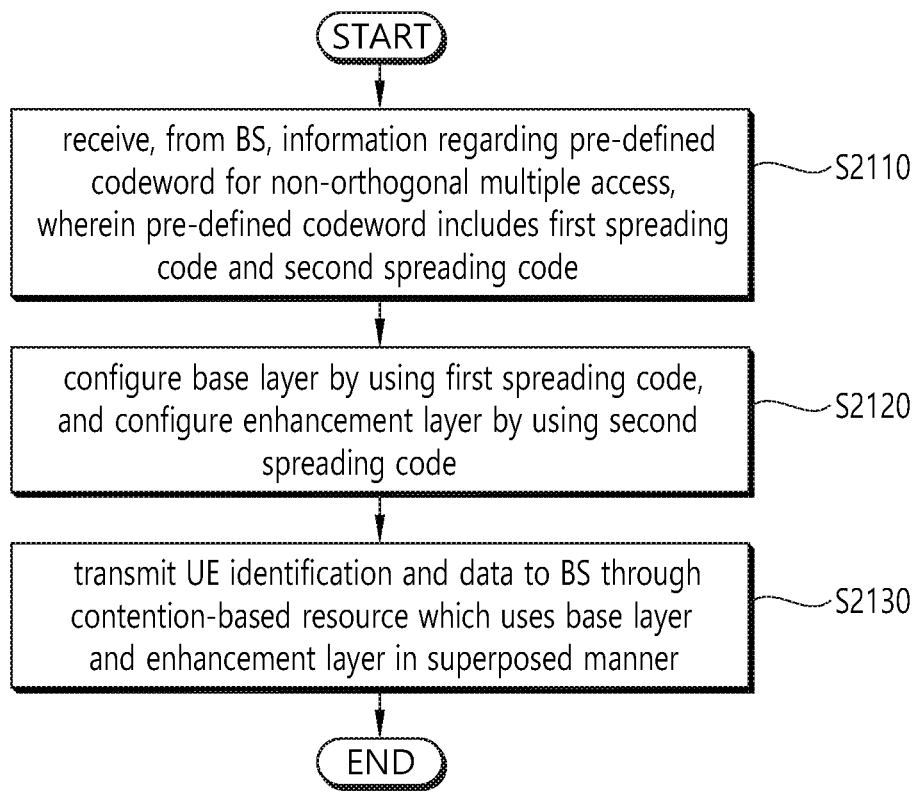
FIG. 21 is a flowchart showing a procedure of transmitting contention-based data by applying hierarchical modulation according to an embodiment of the present specification.

FIG. 21 is a flowchart showing a procedure of transmitting contention-based data by applying HM according to an embodiment of the present specification.

First, a contention-based resource may correspond to a resource region for contention-based uplink connection or uplink data transmission on the basis of non-orthogonal multiple access In step S2110, a UE receives, from a BS, information regarding a pre-defined codeword for non-orthogonal multiple access. The pre-defined codeword includes a first spreading code and a second spreading code. The pre-defined codeword may correspond to all codewords included in a codebook pre-defined between the BS and the UE. Therefore, both of the first spreading code and the second spreading code may correspond to the codeword.

In step S2120, the UE configures a base layer by using the first spreading code, and configures an enhancement layer by using the second spreading code.

In step S2130, the UE transmits a UE identification and data to the BS through a contention-based resource which uses the base layer and the enhancement layer in a superposed manner. In this case, the UE identification is transmitted through the base layer, and the data is transmitted through the enhancement layer. In addition, the UE identification and the data are transmitted through the same data channel. The UE identification and the data may be transmitted only with the data channel without having to distinguish a control channel and the data channel, each of which has different reliability.

That is, in the present embodiment, one user (or UE) performs contention-based transmission by superposing two layers (a base layer and an enhancement layer) in a wireless communication system to which a non-orthogonal multiple access scheme is applied. Since the base layer and the enhancement layer are identified with a codeword, a contention-based resource may be identified with the base layer and the enhancement layer according to the codeword.

The BS may perform multi-user detection (MUD) for the data and the UE identification transmitted by the UE. If the BS succeeds in detection of the UE identification and fails in detection of the data, the UE may receive a retransmission request for the data from the BS. Since detection of the UE identification is successful, the BS can recognize which UE transmits the data, and thus data retransmission can be requested to a corresponding UE. The UE may retransmit the data to the BS through the enhancement layer. In this case, the UE identification and the data retransmitted from the UE may be decoded by being combined to each other. Without having to retransmit the UE identification, the BS may decode the UE identification by combining the retransmitted data and the UE identification previously transmitted through the base layer.

In addition, the UE may transmit a reference signal for channel estimation to the BS. In this case, the number of reference signals is less than the number of pre-defined codewords. In addition, it may be configured such that the base layer and enhancement layer which are used in a superposed manner may correspond to one reference signal. The reference signal may correspond to a DMRS.

Conventionally, since contention-based data transmitted from multiple users is identified with the DMRS, it has been meaningless even if the number of codewords is greater than the number of DMRSs. However, if the base layer and enhancement layer for one user are tied to one DMRS, two codewords can be used with one DMRS. Therefore, even if the number of codewords is greater than the number of DMRSs, it is possible to identify more layers than the number of DMRSs.

In addition, the UE may receive power allocation information for the base layer and the enhancement layer from the BS through radio resource control (RRC) signaling, high layer signaling, or common control information. Accordingly, the BS performs channel equalization on the basis of the power allocation information for each layer.

A code rate for the base layer and a code rate for the enhancement layer may be designated according to a codeword index of the predefined codeword. Alternatively, modulation and coding scheme (MCS) for the base layer and MCS for the enhancement layer may be designated according to the codeword index of the predefined codeword.

That is, a relation between the codeword for the base layer/enhancement layer and the codeword index and a relation between the MCS for the base layer/enhancement layer and the codeword index are broadcast to all UEs located in a cell in a look up table manner. The codeword index may be pre-defined by being tied to the codeword for each user. Therefore, the BS may estimate a code rate on the basis of a codeword index when performing blind detection. By recognizing the base layer, the BS may select a layer to be preferentially selected when performing SIC.

Although it is exemplified above that the invention is applied when a spreading codeword to be decoded based on SIC in a receiving end is applied to the base layer and the enhancement layer, the invention may also be equally applied to a spreading codeword or codebook scheme in which decoding is performed through ML, MPA, or the like in the receiving end. For example, when a single user can use two or more layers by identifying the layers according to signal strength (power), codeword, codebook, interleaver, or the like, one layer may be applied as the base layer and the other one or more layers may be applied as the enhancement layer to obtain the same effect. In this case, a decoding rate of each layer may be controlled by hierarchically applying the signal strength or the code rate.

For convenience of explanation, the invention is described above by taking an example in which a ratio of the base layers and the enhancement layers is 1:1 from a single user perspective and thus two layers exist. However, the same effect can also be obtained in an environment where a plurality of base layers and enhancement layers exist. For example, a ratio of the base layers and the enhancement layers is N:L from a single user perspective and thus that (N+L) layers exist. In order to support a high decoding rate, a low modulation order and/or low code rate may be applied to N base layers to support a high decoding rate, and a relatively high modulation order and/or high code rate may be applied to L enhancement layers.

Figure 22:
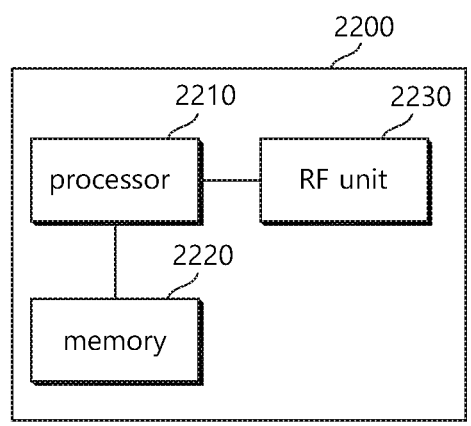
FIG. 22 is a block diagram showing an apparatus for wireless communication for implementing an embodiment of the present invention.

FIG. 22 is a block diagram showing an apparatus for wireless communication for implementing an embodiment of the present invention.

An apparatus 2200 for wireless communication includes a processor 2210, a memory 2220 and a radio frequency (RF) unit 2230.

The processor 2210 may be configured to implement proposed functions, procedures and/or methods described in this description. Layers of the radio interface protocol may be implemented in the processor 2210. The processor 2210 may handle a procedure explained above. The memory 2220 is operatively coupled with the processor 2210, and the RF unit 2230 is operatively coupled with the processor 2210.

The processor 2210 may include application-specific integrated circuit (ASIC), other chipset, logic circuit and/or data processing device. The memory 2220 may include read-only memory (ROM), random access memory (RAM), flash memory, memory card, storage medium and/or other storage device. The RF unit 2230 may include baseband circuitry to process radio frequency signals. When the embodiments are implemented in software, the techniques described herein can be implemented with modules (e.g., procedures, functions, and so on) that perform the functions described herein. The modules can be stored in memory 2220 and executed by processor 2210. The memory 2220 can be implemented within the processor 2210 or external to the processor 2210 in which case those can be communicatively coupled to the processor 2210 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method for transmitting, by a user equipment (UE), contention-based data in a wireless communication system to which a non-orthogonal multiple access scheme is applied, the method comprising:
    receiving, from a base station, information regarding a predefined codeword for non-orthogonal multiple access, wherein the predefined codeword comprises a first spreading code and a second spreading code;
    configuring a base layer by using the first spreading code, and configuring an enhancement layer by using the second spreading code;
    transmitting, to the base station, a UE identification and data through a contention-based resource which uses the base layer and the enhancement layer in a superposed manner;
    receiving, from the base station, a retransmission request for the data if the base station succeeds in detection of the UE identification and fails in detection of the data; and
    retransmitting, to the base station, the data through the enhancement layer,
    wherein the UE identification is transmitted through the base layer, and
    wherein the data is transmitted through the enhancement layer.

2. The method of claim 1, wherein the UE identification and the data are transmitted through the same data channel.

3. The method of claim 1, further comprising transmitting, to the base station, a reference signal for channel estimation, wherein the number of reference signals is less than the number of the predefined codewords, and
    wherein the base layer and the enhancement layer which are used in a superimposed manner are configured to correspond to one reference signal.

4. The method of claim 1, further comprising receiving, from the base station, power allocation information for the base layer and the enhancement layer through radio resource control (RRC) signaling, high layer signaling, or common control information.

5. The method of claim 1,
    wherein a code rate for the base layer and a code rate for the enhancement layer are designated according to a codeword index of the predefined codeword, or
    wherein modulation and coding scheme (MCS) for the base layer and MCS for the enhancement layer are designated according to the codeword index of the predefined codeword.

6. A UE for transmitting contention-based data in a wireless communication system to which an non-orthogonal multiple access scheme is applied, the UE comprising:
    a transceiver that transmits and receives a radio signal; and
    a processor operatively coupled to the transceiver, wherein the processor is configured to:
    receive, from a base station, information regarding a predefined codeword for non-orthogonal multiple access, wherein the predefined codeword comprises a first spreading code and a second spreading code;
    configure a base layer by using the first spreading code, and configure an enhancement layer by using the second spreading code;
    transmit, to the base station, a UE identification and data through a contention-based resource which uses the base layer and the enhancement layer in a superposed manner;
    receive, from the base station, a retransmission request for the data if the base station succeeds in detection of the UE identification and fails in detection of the data; and
    retransmit, to the base station, the data through the enhancement layer,
    wherein the UE identification is transmitted through the base layer, and
    wherein the data is transmitted through the enhancement layer.

7. A method for transmitting, by a base station, contention-based data in a wireless communication system to which a non-orthogonal multiple access scheme is applied, the method comprising:
    transmitting information regarding a predefined codeword for non-orthogonal multiple access to a user equipment (UE), wherein the predefined codeword comprises a first spreading code and a second spreading code;
    receiving, from the UE, a UE identification and data through a contention-based resource which uses the base layer and the enhancement layer in a superposed manner;
    transmitting a retransmission request for the data from the base station if detection of the UE identification is successful and detection of the data fails; and
    receiving data retransmitted from the UE through the enhancement layer,
    wherein the base layer is configured by using the first spreading code, and the enhancement layer is configured by using the second spreading code,
    wherein the UE identification is received through the base layer; and
    wherein the data is received through the enhancement layer.

8. The method of claim 7, wherein the UE identification and the data are received through the same data channel.

9. The method of claim 7, further comprising:
performing multi-user detection (MUD) for the data and the UE identification;
wherein the UE identification and the data retransmitted from the UE are decoded by being combined to each other.

10. The method of claim 7, further comprising receiving a reference signal for channel estimation from the base station,
wherein the number of reference signals is less than the number of pre-defined codewords, and
wherein the base layer and enhancement layer which are used in a superposed manner are configured to correspond to one reference signal.

11. The method of claim 7, further comprising transmitting power allocation information for the base layer and the enhancement layer to the UE through radio resource control (RRC) signaling, high layer signaling, or common control information.

12. The method of claim 7,
wherein a code rate for the base layer and a code rate for the enhancement layer are designated according to a codeword index of the predefined codeword, or
wherein modulation and coding scheme (MCS) for the base layer and MCS for the enhancement layer are designated according to the codeword index of the predefined codeword.

* * * * *